(12) United States Patent
Sisk

(10) Patent No.: US 7,988,386 B2
(45) Date of Patent: Aug. 2, 2011

(54) SPLIT COLLAR WITH OFFSET HOOK AND HINGE HOPPER ASSEMBLY

(75) Inventor: David E. Sisk, Bonne Terre, MO (US)

(73) Assignee: Bulk Tank, Inc., Park Hills, MO (US)

( * ) Notice: Subject to any disclaimer, the term of this patent is extended or adjusted under 35 U.S.C. 154(b) by 276 days.

(21) Appl. No.: 12/364,643

(22) Filed: Feb. 3, 2009

(65) Prior Publication Data

US 2009/0211655 A1   Aug. 27, 2009

Related U.S. Application Data

(63) Continuation-in-part of application No. 12/249,672, filed on Oct. 10, 2008.

(60) Provisional application No. 61/030,777, filed on Feb. 22, 2008.

(51) Int. Cl.
*B65G 53/46* (2006.01)

(52) U.S. Cl. ..... 406/127; 406/144; 285/365; 285/133.11

(58) Field of Classification Search .................. 406/127, 406/128, 139, 130, 131, 132, 133, 144
See application file for complete search history.

(56) References Cited

U.S. PATENT DOCUMENTS

| | | | | |
|---|---|---|---|---|
| 3,174,807 A | * | 3/1965 | Adler | 406/130 |
| 3,450,438 A | * | 6/1969 | Moller | 406/31 |
| 3,627,383 A | * | 12/1971 | Adler | 406/128 |
| 4,151,935 A | * | 5/1979 | Dugge | 222/556 |
| 4,312,607 A | * | 1/1982 | Van Auken | 406/128 |
| 4,411,560 A | * | 10/1983 | McComb | 406/128 |
| 4,695,207 A | * | 9/1987 | Miller | 406/130 |
| 4,974,999 A | * | 12/1990 | Fritz et al. | 406/145 |
| 5,676,404 A | * | 10/1997 | Sisk | 285/133.11 |
| 5,842,681 A | | 12/1998 | Sisk | |
| 6,378,443 B2 | * | 4/2002 | Burian et al. | 105/280 |
| 6,582,160 B2 | * | 6/2003 | Campbell et al. | 406/131 |
| 6,607,177 B2 | | 8/2003 | Burian | |
| 6,616,123 B2 | | 9/2003 | Burian | |
| 6,786,362 B2 | | 9/2004 | Sisk | |
| 7,165,789 B2 | | 1/2007 | Burian | |

* cited by examiner

*Primary Examiner* — Joe Dillon, Jr.
(74) *Attorney, Agent, or Firm* — Paul M. Denk

(57) ABSTRACT

A mounting assembly uses one hinge and one cam bolt mutually offset upon a two piece collar. A hopper tee has a member usually a vertical pipe and occasionally a horizontal pipe that connects to a hopper flange to receive bulk material. This assembly has two collars that mutually engage and surround a hopper flange. Pins pass through the collar pieces and the hopper flange then secure to tapped holes in the collar pieces to prevent rotation. A collar piece mounts a hook bolt and the other collar piece mounts a hinge in a spaced apart and offset manner. The other collar piece has a pivotal connection to a hinge arm and opposite the hinge arm, the hook bolt engages a cam. Opening the cam unfolds the tee downwardly while the hook bolt remains engaged. This partially open position allows for removal and installation of a valve. In opening and closing the assembly, the hinge arm spaces the flange below a hopper to admit a valve. The present invention fits standard hopper tee flanges, has a ground clearance below the horizontal member of at least 7 inches, and aids in the unloading of bulk materials.

18 Claims, 16 Drawing Sheets

SPLIT COLLAR WITH OFFSET HOOK AND HINGE HOPPER ASSEMBLY

CROSS REFERENCE TO RELATED APPLICATION

This continuation in part application claims priority to the pending non-provisional application having Ser. No. 12/249,672 filed on Oct. 10, 2008 which claims priority to the provisional application having Ser. No. 61/030,777 filed on Feb. 22, 2008, and all are commonly owned by the same inventor.

BACKGROUND OF THE INVENTION

This invention relates generally to hopper tees used in bulk material handling, and more specifically pertains to a split collar that fits upon a hopper flange and that pivotally mounts a hinge mutually offset from a cam. A unique aspect of this invention is the hinge and cam bolt mechanism offset upon a common diagonal that allows opening of the assembly for receiving a valve body without disengaging the cam bolt. The invention is especially useful for installing and removing valve bodies where ground clearance is limited.

Hoppers, or tank trailers, regularly transport bulk commodities such as industrial and food products. When the hopper, or tank trailer, reaches its destination, the bulk commodity is unloaded, typically by a power take off driven truck mounted blower or a pneumatic system of a plant or factory. The bulk commodity generally unloads from the hopper and into a pipeline. To complete the unloading, hopper tees are mounted to the discharge outlet of the hoppers, or bins, and include a valve body collocating below the discharge outlet that regulates the amount of product discharged into the hopper tee. The hopper tee conventionally has a vertical section of constant dimension and shape and a horizontal section also of constant dimension and shape forming the inverted T shape configuration. To transfer the bulk commodity, the material is moved out of the hopper, or bin, by gravity flow or air pressure vibration through the valve body and into the vertical section of the hopper tee. The clean discharge pipe is connected to the horizontal section of the tee. Pneumatic conveyance of the bulk material through the pipe occurs by establishing a pressure differential in the pipe.

The prior art hopper tees have a complete, one piece assembly that includes a vertical section, connecting to a hopper, and a horizontal section, connecting to a discharge pipe. The prior art hopper tee design fits below the bottom of the bins of pneumatic tank trailers. Typically, the valve of a bin bolts to the flange of the hopper tee. Installation and removal of a valve typically requires pivoting the hopper tee completely away from the footprint of the valve. Prior art hopper tees generally pivot about an axis parallel to the horizontal section but spaced away from the central longitudinal axis of the hopper tee. In opening a prior art hopper tee, the hopper tee swings downwardly and through nearly a right angle so that the valve body can be installed or removed. Swinging of the hopper tee rotates the tee so that a significant portion of the ground clearance below the hopper becomes occupied by the hopper tee, generally for most of the overall height of the vertical section.

Although prior art hopper tees function well for their intended purposes, some hopper tees lack proper ground clearance for long trailers. Ground clearance has afflicted the tank trailer trucking industry for years. For example, as the hopper tee mounts the tank, ground clearance problems arise when a long trailer, such as a tank trailer, crosses railroad tracks or other uneven surfaces. The longer the trailer, the easier a hopper tee becomes stuck upon a railroad rail, berm, or other short height surface condition. A stuck trailer delays delivery of product to its destination, risks delay penalties to the trucking company, and increases recovery and repair costs of the tank trailers. When a valve jams or requires a size substitution, the clearance between the hopper tee and the ground, rail, hatch, or intake below may be insufficient to fully open the hopper tee from the flange of the hopper. In that situation, the hopper requires movement to a location of suitable ground clearance for valve repairs. However, such movement delays unloading of product and adds to operating costs for a tank trailer trucking company.

The Department of Transportation (DOT) and state highway departments have established heights, widths and lengths the tank trailers must meet. When the hauler transports light density products, such as plastic pellets, the hauler requires a larger cubic foot capacity, or volume, to haul a maximum payload and make hauling such products economically feasible. To increase the cubic foot capacity and remain within DOT height, width and length standards, the prior art and industry have dropped the bottom of the hopper. However, the bottom of the hopper requires angled walls (due to the angle of repose of the bulk material) that funnel down to the hopper tee to allow for emptying of bulk granular material. For most dry bulk products the angle of repose is approximately 45 degrees to the horizontal to obtain the maximum tank volume, in cubic feet, while remaining within the mandated dimensions.

DESCRIPTION OF THE PRIOR ART

A variety of patents have issued upon various devices to ease the transfer and unloading of bulk granular ingredients from a hopper or bin into a discharge line for delivery to a plant or factory. The various devices also aid truckers, plant personnel, and mechanics in opening the tees for unloading cargoes and for maintenance of the tees. Prior art hopper tees have a construction of a vertical pipe welding to a horizontal pipe in a generally T shape. These tees remain subject to excessive internal wear by the friction of bulk materials and eventually fail as they wear away. Some tees require opening the tee more then ninety degrees in rotation to access the valve body and other tees have dual pivot hinge assemblies that swing tees away in an erratic manner. The tees occasionally open only until contacting the ground or other obstruction beneath a hopper.

The U.S. Pat. No. 6,786,362 to Sisk patent describes a mounting frame having a generally U shaped, single piece construction with a channel. The channel slides upon the hopper flange for bolting through the holes in the flange. The mounting frame has adjustable connecting rods below it to engage the hopper tee for opening and closing. The channel has a size and cross section to slide over the hopper flange.

Another patent to Sisk, U.S. Pat. No. 5,842,681, has a mounting frame with pivot arms as separate pieces from the tee and mounting frame. This assembly utilizes alignment pins on the mounting frame that position it properly in relation to the hopper opening. Further, this assembly has hook bolts secured to tee or lower portion with the hooked end grasping the mounting frame. During usage, a trucker has to support the weight of the hopper tee while rotating the hooked end of the hook bolt to close the assembly upon the hopper opening.

Then the patent to Salco, U.S. Pat. No. 7,165,789 patent describes a hinged two piece coupler with a gasket.

The U.S. Pat. No. 6,616,123 also to Salco shows a single piece upper plate that abuts a hopper flange and a lower plate into which rests a hopper tee flange. The upper plate bolts to the hopper flange and the lower plate sandwiches a valve housing between the plates. This plate assembly omits an L shaped bracket as its hinge and has two cams folding beneath the round valve handle.

And the U.S. Pat. No. 6,607,177 of Salco shows another hopper tee mounting assembly. This assembly has a two piece upper plate that also sandwiches the hopper flange between the upper plate and a retaining plate and the lower plate and a retaining plate. The pairs of plates secure to the hopper flange and tee flange respectively by compression of them.

The prior art also has various hopper tees with a flat door, large wings extending coplanar with the door, and carriage bolts and wing nuts connecting to the wings. Over time, with rugged usage, and subject to environmental factors, the wing nuts and carriage bolts become hard to open and make the door no longer fit flush with the bottom of the horizontal pipe. The improper fit of the prior art door causes excessive wear to the bottom of the horizontal pipe, shortening its useful life. While proper fit requires accurate, and nearly identical, tensioning of wing nuts often in rugged conditions.

The prior art shows various hopper tees that resist the abrasion of bulk materials and that provide bottom drop capability. However, the hopper tees remain subject to industry mandated clearance requirements. One clearance requirement remains 4.25 inches between the top of the flange of the vertical pipe and the center of a 4 inch inside diameter horizontal pipe of a hopper tee. The 4 inch diameter horizontal pipe connects readily with existing 4 inch diameter plant and factory conveying systems. A hopper tee with high ground clearances remains desirable to the bulk material hauling industry.

The prior art allows for unloading of various cargoes. As a hopper may have different cargoes that occupy the hopper sequentially and as cargo users have strict requirements against contamination, the hopper tees and particularly adjacent valves undergo cleaning. This often occurs when a hopper changes from a load of flour to a load of sugar in food product or from a load of black resin pellets to a load of white resin pellets where a contaminant of a small, small amount of a prior load can ruin a later load. Where a hopper will have a load change or a plant mandates a cleaning, a trucker will drive a hopper to a wash facility. Wash facilities are located at plants that receive bulk cargoes and at trucking terminals, among other places. At the wash facility, a trucker or plant personnel or a worker, will verify the hopper as empty, then open the mounting assembly to rotate the hopper tee and valve away from the hopper. Then the worker washes the valve and hopper to remove any residual material from a load before the next load. The prior art generally opens fully and rotates out from under the hopper opening.

In doing so, the prior art opens away from a worker. The worker must reach beneath the hopper opening and separate the valve from the hopper tee for cleaning or clean a valve built into its hopper tee. Such reaching makes a cleaning operation difficult for the worker and borders upon a confined space procedure beneath a hopper. Workers have sought a hopper tee and valve assembly that cleans easily without completely opening away from a hopper opening.

The present invention overcomes the difficulties of the prior art. The present invention includes an offset hinge spaced away from a cam bolt, locator pins in the tee flange, a two piece collar, and J and C shaped hooks near the valve handle not shown by the prior art. The collar has two pieces, neither of which will slide completely over the flange, but that combine to surround the hopper flange and resist dislodging during a bumpy transit upon a road. The collar pieces also permit mechanical adjustment to accommodate various flange diameters. The present invention then has a pivoting feature, such as an L bracket or elbow, integral with the tee flange. The locator pins of the present invention extend upwardly from the tee flange because they are cast integrally with the tee flange. The locator pins pass through the hopper flange holes and then engage cooperating tapped holes in the collar pieces for securement. The hook bolts have a pivoting base upon the tee flange and the bight of the hook bolt engaging the collar piece under cam action. The cam bolt engages the collar pieces using a detachable handle that rotates in a plane perpendicular to the direction of flow through the tee. This rotation allows a worker to close the cam bolt and thus the hopper tee upon the valve body using more leverage than a handle that turns parallel to the direction of flow and generally proximate to the confined spaced in the vicinity of a valve.

SUMMARY OF THE INVENTION

This invention provides a mounting assembly for a hopper tee using one hinge and one cam bolt mutually offset upon a two piece collar. The hopper tee has a vertical pipe—low profile, standard profile, or alternate materials—with an opening that connects to a hopper, or bin, to receive bulk material dropped into the tee and a horizontal pipe centered upon one end of the vertical pipe. The horizontal pipe has an inlet that receives bulk material and pressurized air from ahead of the hopper and an opposite outlet that discharges the bulk material already flowing in the horizontal pipe and that received from the hopper through the vertical pipe. The vertical pipe has a flange that abuts the hopper and an opening in the flange that matches the opening of a valve on the hopper itself.

This assembly has two collars that mutually engage a hopper flange to surround it. Alignment pins pass through the underside of the collar pieces, through standard holes in the hopper flange, and secure to tapped holes in the upperside of the collar pieces thus preventing the secured collars from rotating upon the hopper flange. One collar piece provides a mount for a hook bolt and the other collar piece provides the mount of a hinge, generally wider than the hook bolt mount. The mounts of the collar pieces are spaced apart and offset. The other collar piece has a pivotal connection to a hinge arm extending downwardly and inwardly to a hopper tee flange. The hinge arm pivots upon a polymer bushing in the mount of the other collar piece. The mount for the hook bolt supports a polymer bushing through the hook bolt. Opposite the bushing, the hook bolt has a bight that engages a cam upon the horizontal section of a hopper tee.

Opening the cam using a separate handle allows the hopper tee to unfold downwardly from the hopper and away from the cam while the hook bolt remains engaged. This partially open position allows for removal and installation of a standard valve body placed therein. Releasing the hook from the cam allows the hopper tee to open fully. Replacing the hook upon the cam and turning the cam by the handle lifts and closes the hopper tee upon a valve body following washing and other maintenance activity. In opening and closing the assembly, the hinge arm spaces the hopper tee flange below a hopper flange a sufficient distance to admit a standard valve body. With the hinge offset from the hook bolt and only one hinge, the mounting assembly accommodates valve bodies placed therein but slightly askew. The present invention fits standard hopper tee flanges regardless of the flange height.

When partially open, the hopper tee flange of the present invention has two spaced apart lugs generally opposite the hinge arm. The lugs have an outward angle and position to receive the rim of the valve body when placed therein. The lugs secure a valve body against slipping off the hopper tee flange when partially open. As the assembly fully opens, the lugs support the weight of the valve body and prevent an abrupt fall of the valve body from the hopper tee flange.

During unloading of bulk materials through the invention, the materials contact the assembly, the tee, and its various parts. Such contact induces friction between the materials and the tee along with friction within the materials, that is internal friction. The rise in friction during unloading creates heat, often measured as a rise in temperature of the tee. Additionally, materials may accumulate within the valve body and adjacent spaces of the hopper tee flange. However, the flute within the hopper tee of the invention lowers the friction between the tee and materials and the internal friction of the materials during the turn from the vertical pipe to the horizontal pipe. The present invention causes a temperature rise in the tee generally 10° F. to 20° F. less than prior art tees, or an unloading temperature generally 10° F. to 20° F. closer to that of the product temperature. Limiting the unloading temperature rise becomes important for heat sensitive bulk materials where higher temperatures may cause the bulk materials, to melt or to set or to congeal, such as to become "stringers" of melted plastic pellets, before departing the tank trailer. And preventing contamination between loads in the same hopper becomes critical to certain industries, particularly foodstuffs and plastics. The present invention aids in the cleaning of valves and hopper tees following unloading of bulk materials from various truck, rail, and ship transporters. The assembly partially opens for easy access to the valve body.

In a rising or high fuel cost environment, trucking companies, drivers, and their customers seek to minimize costs at any opportunity. The prior art has sought various devices to unload bulk material from a vertical hopper into a horizontal line and to open those devices for cleaning. Those prior tees have performed however, the present invention also increases the rate of bulk material unloading and lowers cleaning times. In doing so, the present invention allows a driver or plant mechanic to clean a valve body faster than prior art mounting frames and devices. The driver or plant mechanic need not fully open the assembly to fully clean a valve body and nearby hopper tee components. The driver or plant mechanic need not drop the hopper tee completely and crawl beneath a hopper to direct a cleaning hose to the valve body swung away from the worker. Additionally, unloading fifteen to twenty minutes sooner than before also aids trucking companies and the plants and factories that receive bulk materials from them. Faster unloading and less time cleaning leads to more impressed customers, more satisfied drivers, and more loads, or hauls, per day, week or month thus improving revenues to trucking companies.

Further, during unloading of a hopper trailer, the truck remains idling as it provides blower air in some cases. An idling truck often consumes a gallon of diesel fuel per hour. During usage of the invention, unloading raises a truck's engine speed to three times that of ordinary idling, measured in RPM, and consumes three gallons of diesel fuel per hour of unloading. The present invention, lowering unloading times noticeably, reduces idling times of trucks thus, leading to fuel cost savings. The present invention increases the operating efficiencies of trucks when measured in miles per gallon or hours per gallon thanks to decreased unloading times. The present invention aids truckers and their companies in using less diesel fuel to accomplish the same unloading job.

It is, therefore, the principal object of this invention is to provide a self aligning assembly securing upon a hopper flange that closes upon a valve body using one hinge and a counterpart single hook bolt thus the assembly undergoes adjustment upon two points instead of four.

Still another object of this split collar mounting assembly is to seal uneven hopper flanges through use of a split collar.

Still another object of this split collar mounting assembly is to have a hinge with a single fixed axis of rotation relative to the hopper flange.

Still another object of this split collar mounting assembly is to provide alignment pins that do not threadily engage a hopper flange.

Still another object of this split collar mounting assembly is to provide the assembly with a weight of approximately one quarter or six pounds less than prior art hopper tees.

Still another object of this split collar mounting assembly is to allow removal of a valve body without unlatching a tee from the hopper flange.

Still another object of this split collar mounting assembly is to use fewer parts with resulting lower maintenance demands and overall lower lifecycle costs of the assembly.

Still another object of this split collar mounting assembly is to utilize fluting that increases throughput of product into and out the assembly through siphon action.

Still another object of this split collar mounting assembly is to unload product faster and at cooler temperatures than with prior art hopper tees.

Still another object of this split collar mounting assembly is to allow installation of the device upon standard size hopper flanges.

Still another object of this split collar mounting assembly is to increase the clearance from the lowest extent of the horizontal pipe to the ground surface when the invention is installed.

Still another object of this split collar mounting assembly is to meet dimensional and clearance requirements of federal and state agencies along with trucking and material handling industry standards.

Still another object of this split collar mounting assembly is to provide additional embodiments of the hopper tee component of the invention that can be readily removed for cleaning, such as washing, and when changing between unloading of different materials.

Still another object of this split collar mounting assembly is to improve the accessibility of the cam for partially opening, fully opening, and closing the assembly and removing the valve body, with a cam bolt allowing for installation facing one side of the trailer and rotation of the cam about an axis parallel to the length of a trailer.

Still another object of this split collar mounting assembly is to provide an assembly that is opened and later secured by an operator using a single handle.

Still another object of this split collar mounting assembly is to provide embodiments of this invention where the assembly avoids usage of hinges that pivots upon two axes that formerly permitted misalignment of the hopper tee to the valve body and erratic tee swing away during opening.

Still another object of this split collar mounting assembly is to provide a cam, hinge, and hopper tee of the invention that open readily after an extended period of non-usage, such as six months.

Still another object of this split collar mounting assembly is to provide embodiments that open readily, such as upon polymer bushings, with a minimum of lubrication and its risk of load contamination.

These and other objects may become more apparent to those skilled in the art upon review of the summary of the invention as provided herein, and upon undertaking a study of the description of its preferred embodiment, in view of the drawings.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
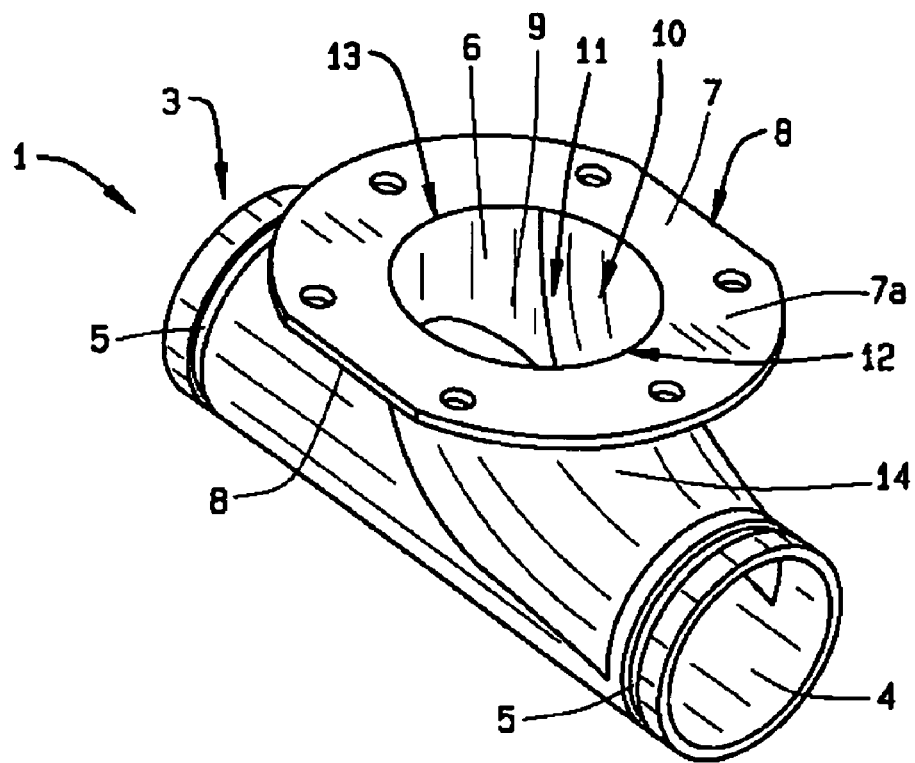
FIG. 1 shows an isometric view of a fluted hopper tee ready for installation upon a valve and into an unloading line.

In referring to the drawings, FIG. 1 shows an integral tee, generally known as a hopper tee, of the present invention 1 in a perspective view. The present invention has a generally transverse hollow pipe, hereinafter horizontal pipe 2, round in cross section and of a known diameter. The horizontal pipe has two opposed ends, one end being an inlet 3 that receives material sent into the hopper tee under pneumatic pressures and the opposite end being an outlet 4 that discharges material from the inlet and material unloaded from a hopper, or bin, into the hopper tee. The inlet and the outlet each have a perimeter slot 5 for coupling the invention 1 into a pneumatic system for unloading. The coupling slots 5 generally extend around the entire circumference of the lower pipe proximate the inlet and the outlet.

Generally centered upon and perpendicular to the horizontal pipe, the fluted hopper tee 1 has a vertically directed hollow pipe, hereinafter vertical pipe 6. The horizontal pipe is generally transverse, or perpendicular to the vertical pipe. The vertical pipe is also round in cross section and of a known diameter. The vertical pipe has a flange 7 at one end away from the horizontal pipe. The flange extends outwardly from the pipe in a planar form that is parallel to the longitudinal axis of the lower pipe. The flange has a top surface 7a and pattern of holes there through that mate with bolts present in valves commonly used in the bulk material hauling industry. In this embodiment, the flange has a truncated round shape where the flange has two mutually parallel straight edges 8, also parallel to the longitudinal axis of the lower pipe. Centered upon the flange, the vertical pipe has an opening 9 that matches the inside diameter of the valves upon hopper used in the bulk material industry.

Where the flange adjoins the vertical pipe, generally as the top surface meets the opening 9, like at a lip, the key feature of the invention begins. The invention provides a flute 10, or a rounded groove, to the interior of the vertical pipe that begins at the flange and extends in a curvilinear manner into the horizontal pipe in the direction of the outlet. The flute has an initial width comparable to the diameter of the opening 9 then the width of the flute narrows as it approaches the outlet 4. The path of the flute is generally shown with a flute line 11 that follows a radius of curvature with a center point proximate the outlet 4. As the flute extends from the flange and curves towards the outlet, the flute tapers in its diameter over an area of transition 14 that may appear as a convex shape, or bulge, in later views of the invention. Where the flute intersects with the flange, the vertical pipe has a radius of curvature immediately. The intersection of the flange with the flute defines a fore edge 12 and where the vertical pipe has a typical connection, or square connection, to the flange an aft edge 13 exists. The fore edge extends for over 120 degrees of arc of the opening 9, centered upon the horizontal pipe. The aft edge occupies the reminder of the perimeter of the opening.

Figure 2:
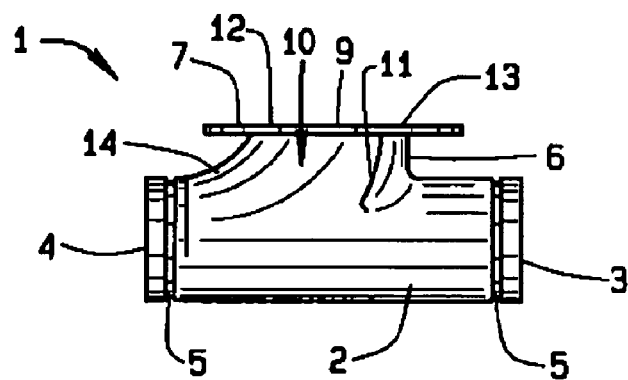
FIG. 2 shows a side view of the fluted hopper tee with the outlet to the left of the figure.

From the side, FIG. 2 shows the present invention and the location and shaping of the flute. The plane of the flange 7 is generally parallel to the centerline of the horizontal pipe 2. Where the vertical pipe adjoins the flange proximate the inlet, the vertical pipe has a generally square or right angle joint to the flange. The square joint typically follows the aft edge 13 and has no downstream radius. Opposite the aft edge, the flange has the fore edge 12 which marks the upper extent of the flute 10. The flute begins at the top surface of the flange and immediately curves as shown in a concave manner towards the outlet 4 through the transition 14. Opposite the transition, the flute line 11 indicates the position and curvature of the flute as it curves from the flange, through the vertical pipe, and then attains the diameter of the horizontal pipe. The flute line indicates the path of the bulk material as it rounds the juncture of the vertically directed hollow pipe and the transverse hollow pipe. The flute provides an internal transition in the fluid like flow of bulk materials from the vertically directed hollow pipe through a substantially ninety degree turn into the transverse hollow pipe.

Figure 3:
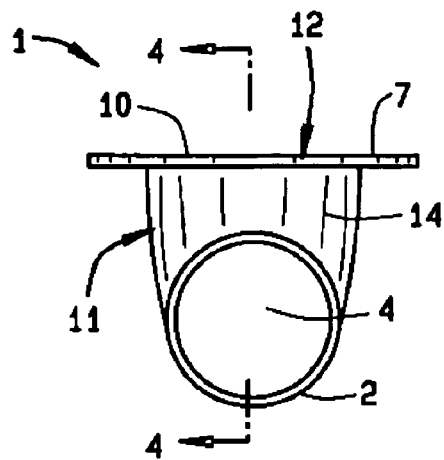
FIG. 3 describes an end view of the fluted hopper tee through the outlet.

As described above, the transition 14 has a bulge like appearance as shown in FIG. 3. The flute 10 begins at the flange 7 and extends forward in the direction of the outlet 4 of the lower pipe 2. The flute has an initial width similar to that of the valve opening in a hopper as at the fore edge 12. The flute then narrows in width as it curves upon a radius until it reaches the diameter of the horizontal pipe. Generally, the hopper valve openings exceed the diameter of the horizontal pipe thus the transition 14 starts wide at the flange and tapers to the horizontal pipe 2. The curvature of the transition also affects the bulge like appearance. The edge of the transition as in this figure defines the flute line 11.

Figure 4:
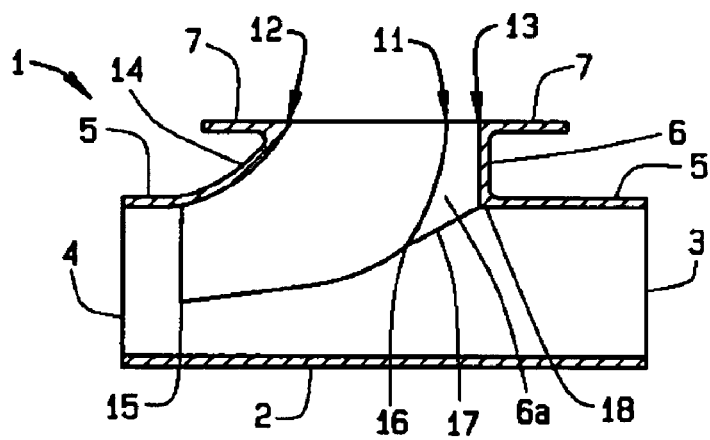
FIG. 4 shows longitudinal section view of the tee.

FIG. 4 shows a sectional view of the invention, lengthwise with the interior exposed, where the key feature operates to accelerate the flow of bulk granular material through the hopper tee. The flange 7 is generally shown horizontal and parallel to the longitudinal axis of the horizontal pipe. The flange has a fore edge 12 at the opening 9 towards the outlet 4 and an opposite aft edge 13 towards the inlet 3. The aft edge defines a square edge that connects the flange, the vertical pipe, and the horizontal pipe. Then the fore edge begins the flute where the vertical pipe intersects the top surface of the flange. The flute curves in a concave manner from the fore edge, through the transition, and reaches the horizontal pipe behind the coupling slot 5 near the outlet 4. Opposite the fore edge, the flute abuts the aft edge and extends as a curvilinear line 11 from the flange through the vertical pipe and partly into the horizontal pipe. As the flute extends across the diameter of the vertical pipe and partly around the circumference, the flute adjoins the inner wall of the vertical pipe, as at 6a.

As soon as the bulk material, or product, leaves the tank, hopper, or tank valve, the bulk material enters the uniquely designed flute of this invention. The flute line begins at the top surface of the flange more than half way across the diameter of the opening 9 and descends at a slight curve towards the outlet through the vertical pipe and into the horizontal pipe. Inside the horizontal pipe, at less than half of the diameter of the horizontal pipe the flute line curves more sharply and attains an asymptotic angle to the centerline of the horizontal pipe. The flute line ends at a confluence point, 15, proximate the outlet slightly below the centerline. At the end of the flute line 11, the flute has reached a width identical to that of the inside diameter of the horizontal pipe. Where the flute begins to curve more sharply, an inflection point, as at 16, starts an eddy line 17 that extends to the intersection of the vertical pipe with the horizontal pipe at 18. Above the eddy line 17 within the aft edge 13 and outside the flute line 11, eddies form in the bulk material flowing from the inlet into the horizontal pipe. The present invention creates less eddy currents and turbulence than prior art tees which leads to less friction between the bulk material and the invention and internal friction of the bulk material. The eddies in the material flow ease the merge of bulk material flowing from the opening 9 into the flute 10 and then follow a curved flow path induced by the flute 10. The fewer eddy currents and more laminar like flow of the bulk material generates less friction and less heat imparted to the invention which allows for a longer useful life compared to prior art tees. The bulk material flow into the horizontal pipe from the inlet starts the bulk material immediately to drop through the opening 9 into a curved flow through the hopper. The bulk material flowing along a curve merges with that flowing along the horizontal pipe much like two watercourses at a confluence become one river.

Bernoulli's principle reminds us that energy is conserved across a straight pipe and through various joints including a hopper tee. Under the Bernoulli equation, the head of the fluidized bulk material entering the fluted hopper tee equals the head of the fluidized bulk material exiting the outlet 4 where head represents the pressure, kinetic, and potential energies. This relationship is shown in the following equation:

$$\frac{p_1}{\gamma} + \frac{v_1^2}{2g} + z_1 + \frac{p_2}{\gamma} + \frac{v_2^2}{2g} + z_2 = \frac{p_3}{\gamma} + \frac{v_3^2}{2g} + z_3$$

Where the bulk material energies at the inlet$_1$ are added with those of the opening$_2$ to equal those energies of the outlet$_3$. The inlet energies and the opening energies create two forces, one force from the tank pressure pushing the bulk material down the tank, and a second force from the line pressure pulling the bulk material down the line beneath the tank or hopper for distribution. The tank pressure is approximately 25 psi while the line pressure is approximately 20 psi. As the potential energy of the bulk material flowing through the opening adds to the kinetic energy of the material from the inlet, the combined material exits the outlet at a greater velocity and thus accelerates unloading of each hopper and an entire trailer of hoppers. Further, in the vicinity of the inner wall 6a of the vertical pipe, the flute causes a venturi, or siphon like, effect that aids in drawing, or pulling, bulk material from the hopper, through the valve, into the opening 9, and thus into the horizontal pipe. Additionally, the bulk material within the flute attains a pressure of approximately 15 psi while the material arriving from the inlet has a pressure of approximately 20 psi. The pressure gradient between the two flows of material augments the siphoning effect of the curved flow and the eddies formed therein.

Figure 5:
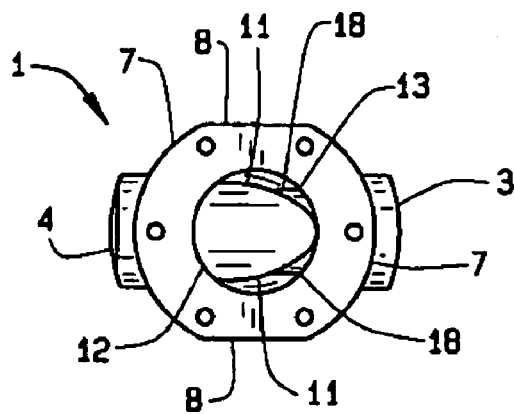
FIG. 5 shows a top view of the tee with the outlet to the left of the figure.

And then FIG. 5 shows a top view of the present invention looking through the opening 9 in the flange 7 into the hopper tee 1, particularly the horizontal pipe 2. The flange, as before, has a truncated round shape with edges 8 parallel to the length of the horizontal pipe. Within the flange, the opening has the aft edge 13 towards the inlet 3 and extending less than half way around the circumference of the opening. The remainder of the opening has the fore edge 12 that begins the flute 10 that descends through the vertical pipe into the horizontal pipe towards the outlet along the flute lines 11. Inwardly and towards the inlet from the flute lines 11, the inner wall 6a extends upwardly from the flute lines to the flange 7 and occupies the remaining circumference of the opening 9 as the aft edge. In this view, the flute lines define a partly parabolic curve with its vertex towards the inlet upon the centerline of the horizontal pipe. The flute lines widen outwardly reaching the inside diameter of the horizontal pipe towards the outlet.

Figure 6:
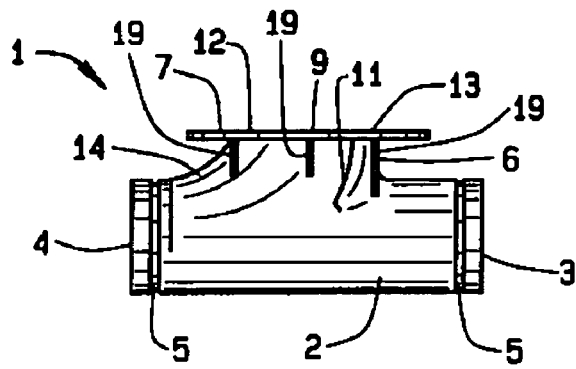
FIG. 6 shows an alternate embodiment of the fluted hopper tee where the flange has braces to the tee.
Figure 7:
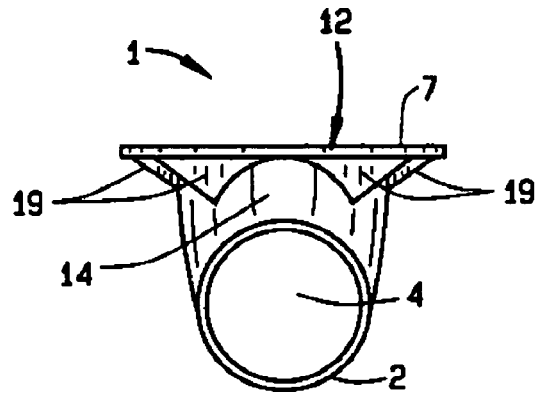
FIG. 7 describes an end view of the alternate embodiment.

Turning to FIG. 6, an alternate embodiment of the present invention is shown with a more rigid vertical pipe 6. This hopper tee has a vertical pipe that merges with a horizontal pipe 2 as previously shown in FIG. 2. The vertical pipe has a flange 7 generally centered upon and perpendicular to the vertical pipe and parallel to the horizontal pipe. The flange has an opening as at 9 for admitting bulk material from the valve of a hopper. Beneath the flange, a plurality of braces 19 extend from the bottom surface 7b of the flange at an angle towards the vertical pipe. The braces, or gussets, are generally parallel to one another and perpendicular to the longitudinal axis of the horizontal pipe. The braces have a generally triangular shape of varying depth, as in FIG. 7, with the shortest depths locating forward in the transition 14 and the greatest depth locating proximate the aft edge 13 and towards the inlet 3. As before, the vertical pipe has a flute 10 defining the transition 14 from the diameter of the opening 9 through an arc to the diameter of the horizontal pipe. The transition begins immediately at the top surface 7a of the flange at the opening 9 along a portion of the circumference of the opening, the fore edge 12. This alternate embodiment applies generally when lighter weight materials are used for the construction of the invention such as aluminum and polymers. The braces serve to stiffen the flange in its connection to a hopper valve and during the vibrations of unloading.

Figure 8:
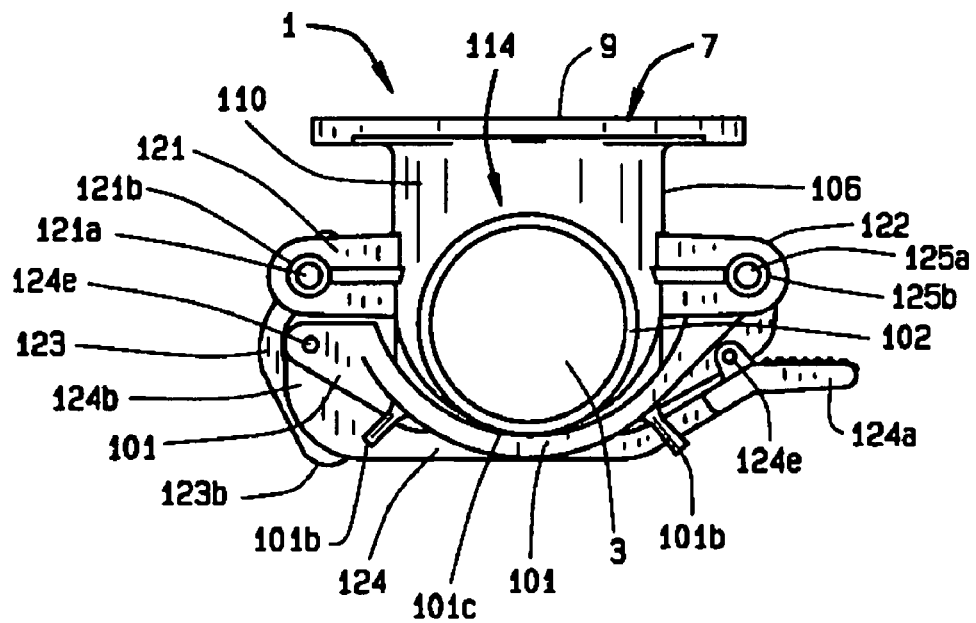
FIG. 8 illustrates an end view of the drop tee embodiment of the hopper tee.
Figure 15:
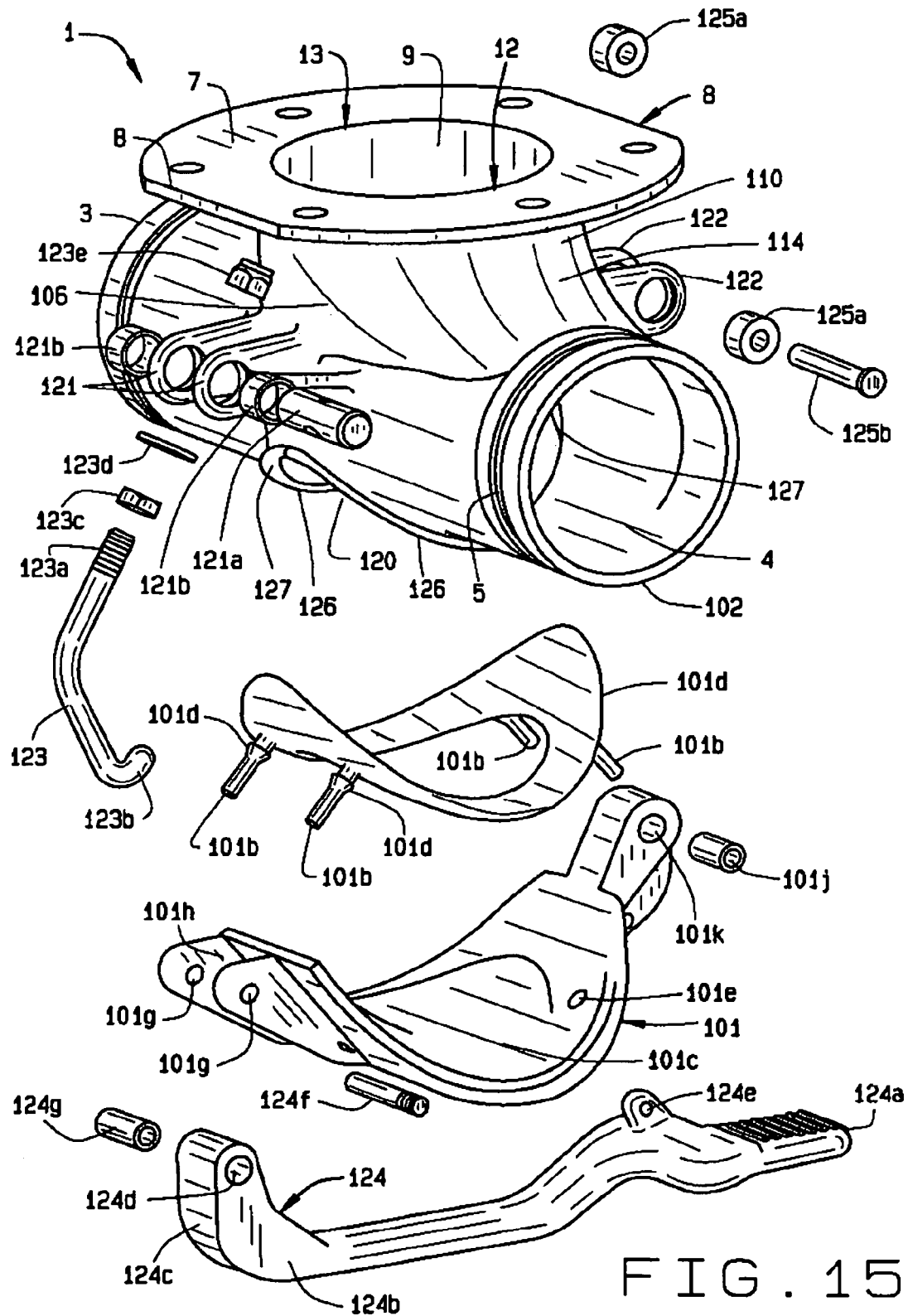
FIG. 15 then provides an exploded view of the drop tee.

FIG. 8 then shows a drop tee embodiment of the present invention. This embodiment has an opening as at 9 through the flange that receives bulk material from the hopper or bin. The opening has a known shape and width, round with a diameter in this description. Opposite the opening, this embodiment of the hopper tee has a door 101 that opens below a horizontal pipe 102. As later shown, the door provides a full port opening, or a drop opening 120, later shown in FIG. 10, of the same width and shape as opening 9 for unimpeded discharge of bulk material from the hopper or bin. Beneath the flange, the drop tee embodiment has a vertical pipe 106 that merges with the center of the horizontal pipe 102. In this view, the vertical pipe has a flute 110 that curves from the opening 9 towards the inlet 3 in a transition 114 that contracts in width from that of the opening to that of the diameter of the horizontal pipe. Generally behind the transition towards the outlet, this embodiment has a pair of pivot ears 121 and an opposite pair of hinge ears 122 where each pair is collinear and extending perpendicular to the vertical pipe and to the horizontal pipe. Each member of a pair of pivot ears and hinge ears is coaxial and coplanar with its opposite counterpart. The pivot ears and hinge ears have a symmetric arrangement about the centerline that allows for changing the door position to either side of a trailer during usage. The pivot ears extend outwardly from the centerline of the horizontal pipe and provides a pivoting point for a pin 121a within a bushing 121b for a cam bolt 123, wherein the bushing is generally a polymer. The cam bolt has a threaded end 123a in a bolted connection through the pin and bushing and opposite the threaded end it has a hook 123b. Between the threaded end and the hook, the cam bolt has an off center bend defined by the threaded end approaching the hook or a generally convex shape as shown in the figure. The cam bolt 123 allows a cam lever 124 to pivot downwardly from one end of the door 101 as the door itself pivots beneath the horizontal pipe for opening to drop bulk material. The cam lever has a generally elongated shape with two opposed ends. One end is the pedal 124a that has a foot grip surface to receive a kick from a trucker during opening. A trucker steps on the pedal, or pulls it downward, which allows for easy opening of the door that swings downwardly out and away from the horizontal pipe. With the present invention, the trucker no longer deals with seized wing nuts, rusted bolts, and galled bolts that accumulated in prior art tees in field use. The pedal has a slight offset as shown in FIG. 15. On the other end, the pedal has a shoulder 124b generally curved upwardly partially around the door. Near the bottom of the shoulder, it has a groove 124c that receives the hook 123b. Near the top of the shoulder, an aperture 124d admits a pin 124f, through a bushing 124g, that pivotally connects the shoulder and the cam lever to the door 101. The cam lever also includes receives a safety pin, marking strap, or security seal through a second aperture 124e that secures the cam lever upwardly towards the hinge ear 122 to prevent inadvertent opening of the cam lever.

Then the hinge ear 122 extends outwardly from the vertical pipe along the same axis as the pivot ear 121 and provides a door hinge 125 with a bushing 125a and a coaxial pin 125b. The door hinge allows the door to pivot upon one edge opposite the pivot ear 121 and opposite the aperture 124d but above the second aperture 124e of the cam lever from a closed to an open position. The cam bolt 123 has threaded rod like connections that allow for adjustments in positioning of the door upon the horizontal pipe. Here in FIG. 8, the door is shown in the closed position where the door 101 abuts a gasket 101a that compresses upon the lip 126 defining the drop opening 120. The gasket seals the door in a positive seal to the door in one motion without adjusting the door at two places as in the prior art. The gasket can be readily replaced if damaged or worn. The door has at least two, preferably four, holes 101e that admit legs 101b through the door. The legs are generally elongated cylinders, round in cross section, that have a conically shaped bump out, or barb 101d, proximate the main portion of the gasket. The barbs 101d are generally spaced away from the gasket slight less than the door 101 thickness for a snug fit of the gasket to the door. The molded gasket has a generally elliptical shape with an open interior and four legs equally spaced upon the inside face of the gasket. The legs align the gasket upon the door in position for a tight seal. When closed in particular, the door in cooperation with the gasket seals to the horizontal pipe so that the inside surface of the door 101c is flush with the inside diameter of the horizontal pipe. The smooth closure of the door upon the horizontal pipe provides for minimal interruption in the flow of bulk material and lessens the Reynolds number of the bulk material when passing through the horizontal pipe with the door closed. The lower Reynolds number leads to a more laminar like flow of the bulk material through the invention.

Figure 9:
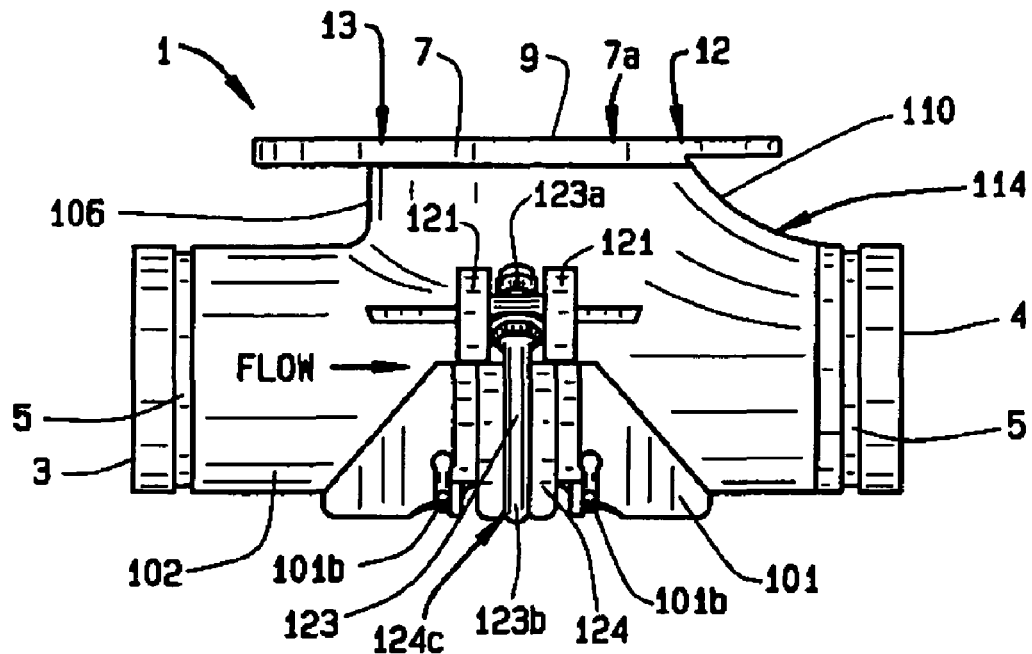
FIG. 9 describes a side view of the drop tee embodiment.

The drop tee embodiment appears from the side in FIG. 9 where a vertical pipe 106 that merges with a horizontal pipe 102. This embodiment has more ground clearance that prior art tees with generally approximately 1½ inches more between the lowest point of the door and the ground. The horizontal pipe has an inlet 3 and an opposite outlet 4 each with a coupling slot 5 as before. The vertical pipe 106 has a flange 7 with an opening 9 that receives bulk material from the hopper or bin above the drop tee. The flange has a top surface 7a that intersects along part of the perimeter of the opening with the vertical pipe defining the aft edge 13. Upon the reminder of the opening 9, the fore edge 12 defines the beginning of the flute 110. The flute curves the vertical pipe forward towards the outlet and begins with a width that of the opening 9 in the flange and then narrows to the diameter of the horizontal pipe. In this embodiment, the flute extends to the immediate vicinity of the coupling slot 5.

Generally centered between the wall 6a of the vertical pipe 106 and the transition 114 of the flute 110, the pair of pivot ears 121 provides two parallel plates to which the cam bolt 123 secures upon the bushing 121b with its internal coaxial pin 121a. The cam bolt has its threaded end 123a passing through a hole in the bushing and the pin secured by two nuts equally spaced about the diameter of the bushing. The cam bolt extends outwardly from the horizontal pipe and bends around the shoulder 124b of the cam lever 124, generally outside of the door. The cam bolt extends downwardly so that its hook 123b engages the groove 124c of the cam lever 124. The cam lever extends beneath and across the door 101 to the opposite side of the drop tee. The door has an inverted saddle like shape that matches the curvature of the horizontal pipe but also rises to allow for a snug fit of the cam lever beneath the door but tight towards the tee. The door seals to the drop opening 120 upon the gasket 101*a* which compresses upon the lip 126. The lip and the drop opening curve upwardly, as in a saddle, to slightly above the centerline of the horizontal pipe. The perimeter of the door, in this drop embodiment, extends slightly outwardly from the lip causing a reduction in ground clearance below the door of approximately one inch.

Figure 10:
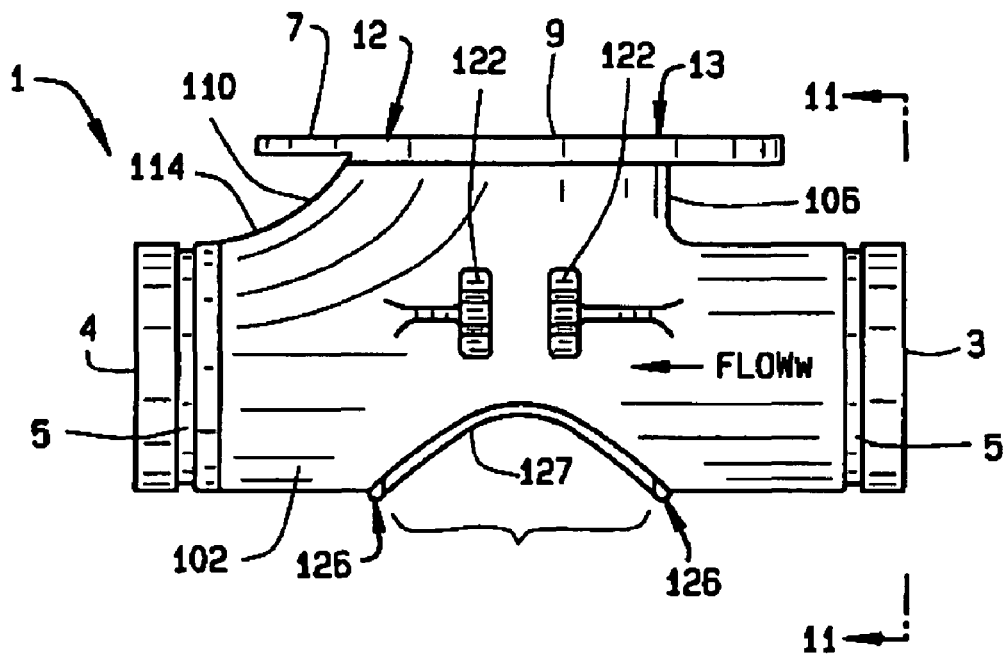
FIG. 10 illustrates a side view of the drop tee without the door.

FIG. 10 then shows the drop tee with the door 101, the cam bolt 123, and the cam lever 124 removed. FIG. 10 is in the opposite direction as FIG. 9. Beneath the hinge ears 122, the drop tee has the drop opening 120 generally of similar diameter as the opening 9 in the flange 7 as later shown in FIG. 12. In this view, the drop opening is bounded by the lip 126 that has a curvi-linear shape upwardly into the lower pipe until the uppermost tangent to the arc is generally parallel to and slightly below the centerline of the horizontal pipe. Alternatively, the lip has a shape of one of parabolic, elliptic, or arcuate. The lip extends slightly outwardly from the surface of the horizontal pipe and provides a slightly concave surface forming a door bead 127 that accepts the gasket 101*a* in compression by the door 101 when closed upon the tee. The shape of the lip and the drop opening minimizes the potential disturbance to the inside surface of the horizontal pipe and impediment of bulk material during unloading.

Figure 11:
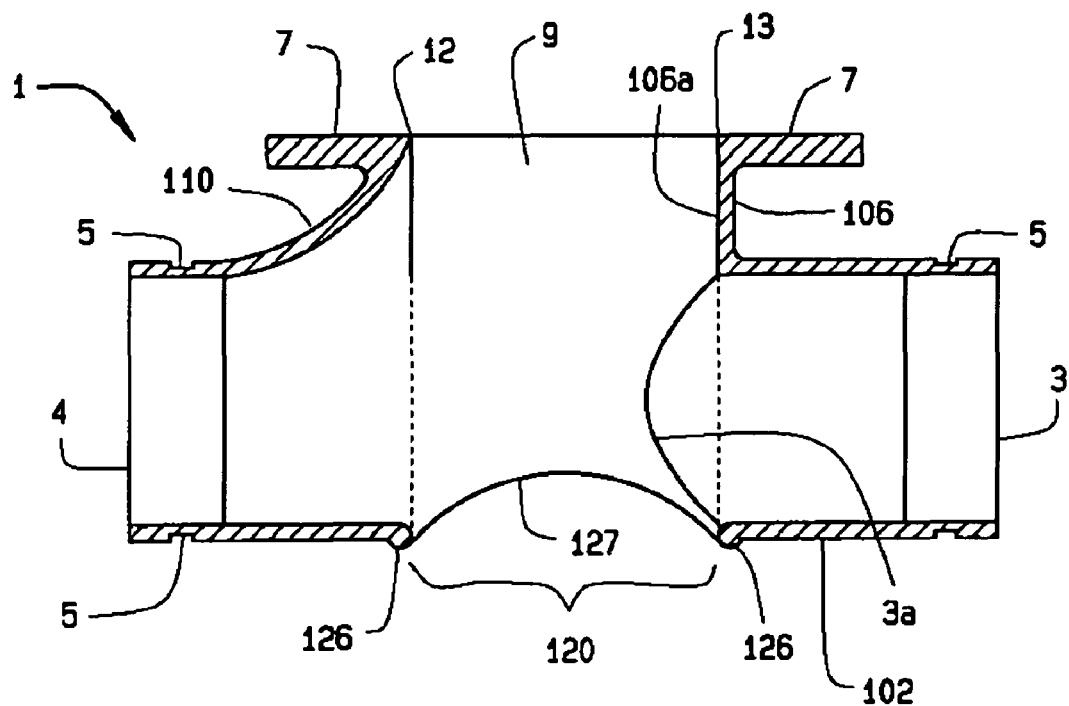
FIG. 11 illustrates a sectional view of the drop tee also without the door.

The drop tee in regards to the door and its closure upon the horizontal pipe has a lengthwise sectional view shown in FIG. 11 in the same direction as FIG. 10. This figure illustrates the immediate curvature of the flute 110 at the top surface 7*a* of the flange 7 that extends just short of the coupling slot 5. Opposite the flute, the vertical pipe has an internal wall 106*a* generally square to the top surface of the flange and towards the inlet 3. The flange has its opening 9 that abuts the valve of a hopper or bin. The opening has a known diameter, often 5 or 6 inches, and the drop tee locates the drop opening 120 directly opposite the opening 9 in the flange. The drop opening has the same inside diameter as the inside diameter of the opening in the flange and follows the circumference of the horizontal pipe. By providing the drop opening with the same diameter as the opening above, the bulk material falls vertically through the drop tee when the door is opened in a smooth flow without any hindrances. The falling bulk material does not constrict to pass through the door nor do eddy currents arise and nor does turbulence develop. This figure further shows the lip 126 extending outwardly from the surface of the horizontal pipe and having a rounded edge towards the drop opening 120. The horizontal pipe 3 merges with the vertical pip 106 along the upright curvi-linear feature 3*a*. Alternatively, the feature has a shape of one of parabolic, elliptic, or arcuate.

Figure 12:
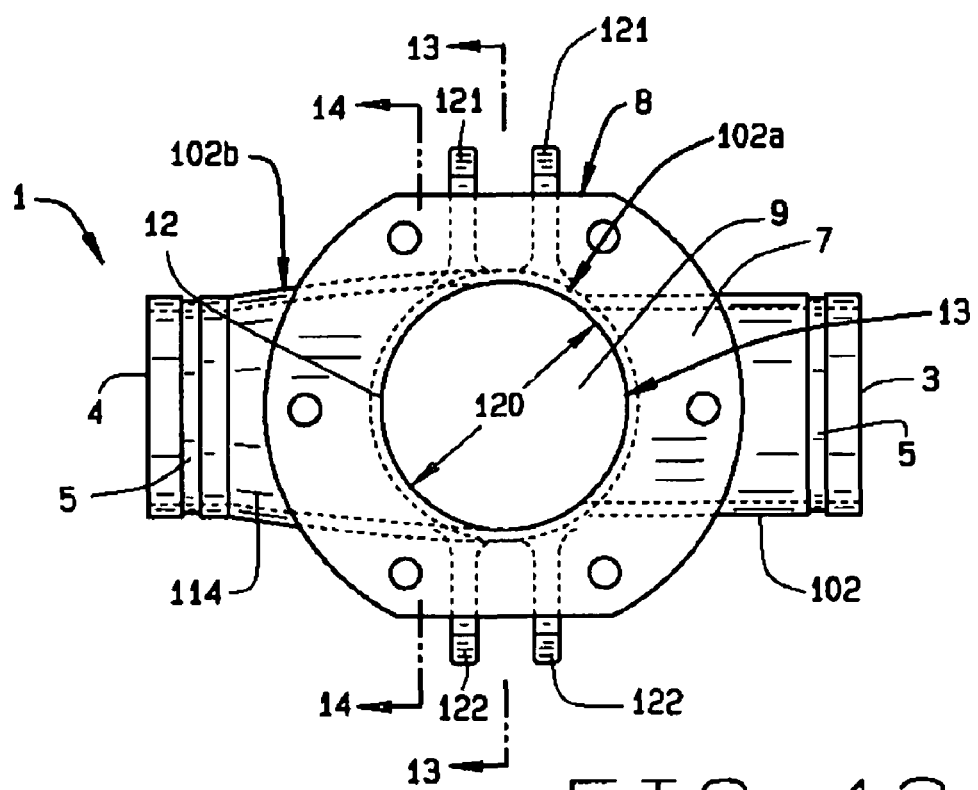
FIG. 12 is a top view of the drop tee.

FIG. 12 then provides a top view of the drop tee with the door, cam lever, cam bolt, and gasket removed. As can be seen, the opening 9 in the flange is concentric with the drop opening 120 located there below and of similar diameter. Bulk material dropping through the opening 9 and the drop opening 120 flows through the drop tee freely when the door is opened. As before, the drop tee has a flange 7 with a pattern of holes thereon for mounting to the valve of a hopper or bin. The flange has a generally round shape but for two parallel edges 8 each also parallel to the centerline of the horizontal pipe. Beneath the edges, the pair of pivot ears 121 and the pair of hinge ears 122 extend mutually opposite and outwardly from the vertical pipe. This view also shows the horizontal pipe widening slightly at its saddle, as at 102*a*, with the vertical pipe. Then the horizontal pipe attains the diameter of the opening 9 across the junction with the vertical pipe. The horizontal pipe continues itself with the diameter of the opening 9 to for a length slightly less than the radius of the flange as at 102*b*. Then the horizontal pipe quickly narrows to the diameter proximate the outlet 4. This widened horizontal pipe before the outlet differs from the preferred embodiment where the transition narrows gradually and further behind the outlet.

Figure 13:
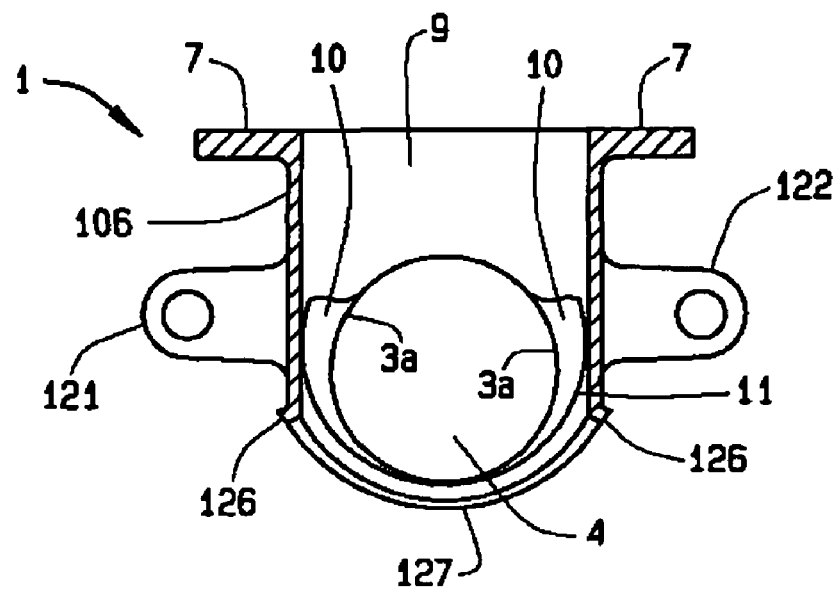
FIG. 13 illustrates a sectional view through the door and hinges of the drop tee.

Turning the drop tee, FIG. 13 shows a sectional view through the center of the pairs of pivot ears 121 and hinge ears 122, looking through outlet 4 towards inlet 3 or upstream, where the door closes upon the gasket that compresses upon the lip 126. The door has a radius of curvature that spans from a lip 126 to the opposite lip across the horizontal pipe. At the location of this section, the lips 126 are spaced apart by the diameter of the opening 9 that exceeds the diameter of the horizontal pipe and the lips are connected by the door bead 127 that in time abuts the gasket. The door radius of curvature and the arcuate length of the door cooperate so that the lowest portion of the door matches the arc at the bottom of the horizontal pipe. The matching of door curvature to the curvature of the horizontal pipe provides a flush and smooth surface to the interior of the drop tee when the door is closed and the tee functions as a hopper tee. Above and behind the door in this figure, the horizontal pipe widens into the flute that begins along the feature line 3*a* and that briefly widens into the flute 10 and then narrows to the bottom of the horizontal pipe along the flute line 11.

Figure 14:
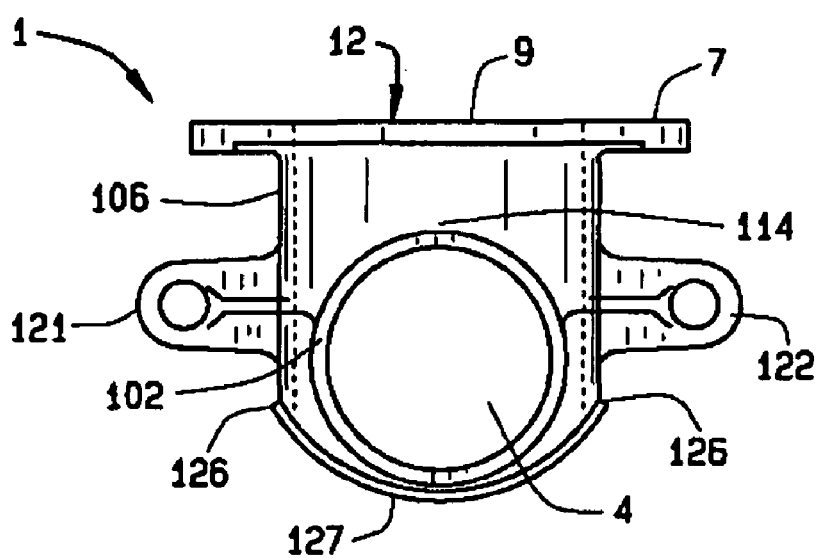
FIG. 14 described an end view of the drop tee with the pivot hinges removed.

Next, FIG. 14 shows the drop tee embodiment in a sectional view towards the outlet 4 and with the pivot ears 121 and hinge ears 122 shown generally having the same horizontal centerline and symmetric positioning. This view is located slightly forward of the section in FIG. 13 towards the outlet. In this location, the door closes upon the horizontal pipe and provides a flush and smooth interior surface. Upon the exterior, the door extends slightly outward from the surface of the horizontal pipe because of the lip.

And, FIG. 15 shows an exploded view of the components of the drop tee. This description begins with the bottom of the figure and moves upwardly through the invention. Here, the invention is in the closed position with the cam lever 124 in a generally horizontal orientation but perpendicular to the line of flow through the invention. The cam lever has a foot pedal 124*a* used by truckers and others to open the invention for discharge of product through the opening 9 in the flange 7 and then the bottom opening 120. Inward from the foot pedal, the cam lever has a second aperture 124*e* that receives a seal or other marking device. Opposite the foot pedal, the cam lever has its shoulder 124*b* that has a greater width than the remainder of the cam lever and curves upwardly. The shoulder has a groove 124*c* generally centered therein that receives the hook 123*b* of the cam bolt 123 as previously described. The shoulder curves upwardly above the level of the foot pedal and has an aperture 124*d* there through with an axis perpendicular to the length of the cam lever. The aperture receives a cam pin 124*f* that fits within a coaxial cam bushing 124*g*. The cam pin provides a pivotal connection of the cam lever to the door 101.

The door has a generally saddle shape with an inside surface 101*c* having the same radius of curvature as the horizontal pipe 102. The door curves upwardly and towards the cam shoulder in the figure, the door has two spaced apart door ears 101*h* that extend outwardly from the door. Each door ear has an aperture 101*g* there through that admits the cam bushing 124*g*. Opposite the door ears, the door has the door tab 101*j* that has an aperture 101*k* there through that admits a door bushing 101*f*. The door bushing cooperates with the hinge ears 122 for opening of the door from the remainder of the tee.

The door tab extends from the top of the curve of the door generally outwardly from the door and the horizontal pipe when the door is closed. Within the saddle portion of the door, that is down slope from the door ears 101h and the door tab 101j, at least two and preferably four holes 101e extend through the thickness of the door. The door holes 101e admit a part of the molded gasket 101a The molded gasket 101a also has a similar saddle shape as the inside face of the door. However, the molded gasket has a large opening there through for passage of product. The opening has a diameter of at least that of the opening 9 in the flange. Due to the saddle shape of the gasket, the opening attains a perimeter similar to a section through a spherical body. As described previously, the gasket compresses under closure of the door upon the lip 126 of the horizontal pipe. To prevent the gasket from sliding out of position, the gasket has two, and preferably four, legs 101b that extend radially outward from the gasket in the direction of the door. The legs align and enter the holes 101e which positions the gasket properly upon the door. Each leg has a barb 101d with a generally inverted tapered shape with maximum diameter towards the gasket tapering to the leg diameter away from the gasket. Each barb is also spaced down the leg a distance similar to the depth of the hole 101e. During installation, a worker pushes the leg into the hole until the barb engages and repeats that for each leg. To remove the gasket, the worker pulls on the leg, lengthening it and narrowing it enough for the barb to pass back through the hole 101e. Removing the gasket aids the trucker or other worker in cleaning the door and avoids cross contamination of loads. The removable gasket can be removed and cleaned in contrast to prior art drop doors that remained connected to a tee which hindered cleaning and raised the chance of cross contamination with its risk of rejecting a load.

The door with its installed gasket rotates upon its door tab 101j within the hinge ears 122 of the main portion of the tee. The hinge ears are mutually parallel and spaced apart generally proximate the top of the lower pipe 102. Each hinge ear has its own aperture that admits a hinge ear bushing 125a that receives a spring clip pin 125 that passes through the bushing 125 and the door bushing 101f and allows the door to pivot or to drop away from the tee, as during unloading. Opposite the hinge ears 122, the tee has the pivot ears 121 where each pivot ear has its own aperture. The apertures of the pivot ears and the hinge ears are spaced symmetrically about the line of flow of the invention to allow for reverse installation of the door if needed in the field. The door of the invention can be installed for right side or left side of trailer usage. Each aperture in a pivot ear receives a pivot bushing 121b that in turn admits a cam pin 121 generally centered within the pivot ears. The cam pin has a diametrical hole through its centered that admits the threaded end 123a of a cam bolt 123. The threaded end has a jam nut 123c and a washer 123d inside of the jam nut located outside of the cam pin and a locking nut 123e inside of the cam pin. The locking nut secures the cam bolt upon the cam pin for hinge action of the cam bolt 123 to the cam lever 124 as previously described.

Inside of the pivot ears and the hinge ears, the invention has the lower pipe 102 with its outlet 4 to the right in this figure. Inside of the outlet, one can view a portion of the door bead 127 denoting the opening 120 in the bottom of the lower pipe. The outlet has its coupling slot 5 inward of the outlet and the lower pipe has the saddle shaped lip 126 below the hinge ears and the pivot ears. The lower pipe continues rearward to an opposite coupling slot 5 and the inlet 3. The lower pipe merges with the vertical pipe 106 in a generally inverted T position. The lower pipe has a transition section, as at 114, upon its top surface and towards the outlet that defines the outward appearance of the flute 110 locating upon the downstream portion of the tee. The flute commences at the forward inside edge 12 of the flange 7. Opposite the forward edge 12, the flange has an aft edge 13 generally square, or a right angle edge. The flange has two exterior, mutually parallel squared edges 8, generally parallel to the length of the lower pipe 102. And the flange 7 extends perpendicular and outwardly from the vertical pipe 106 with a pattern of holes there through for mechanical connection.

Figure 16A:
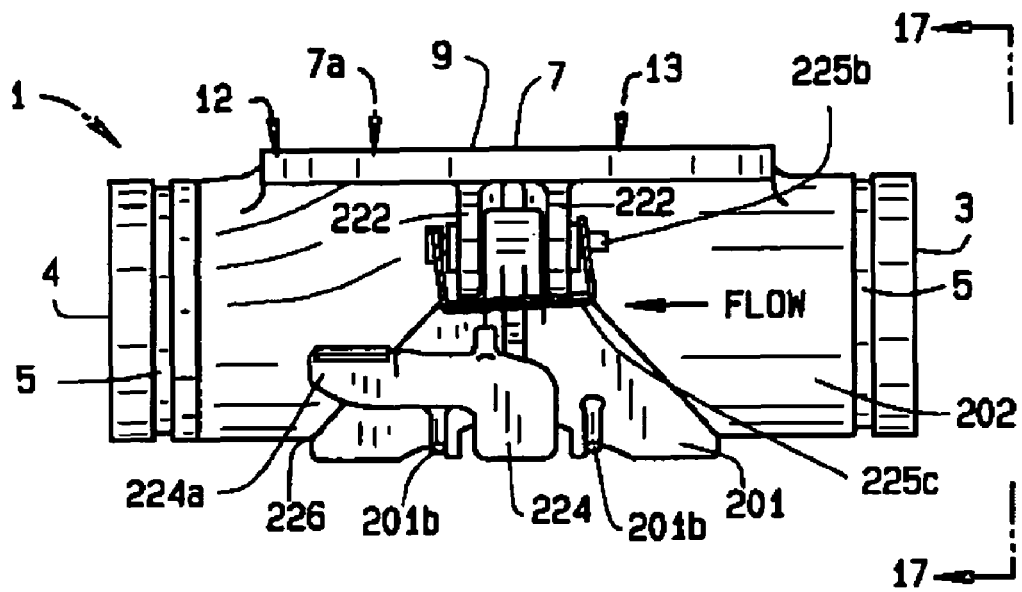
FIGS. 16A and 16B then show an alternate embodiment of the drop tee having a low profile.
Figure 16B:
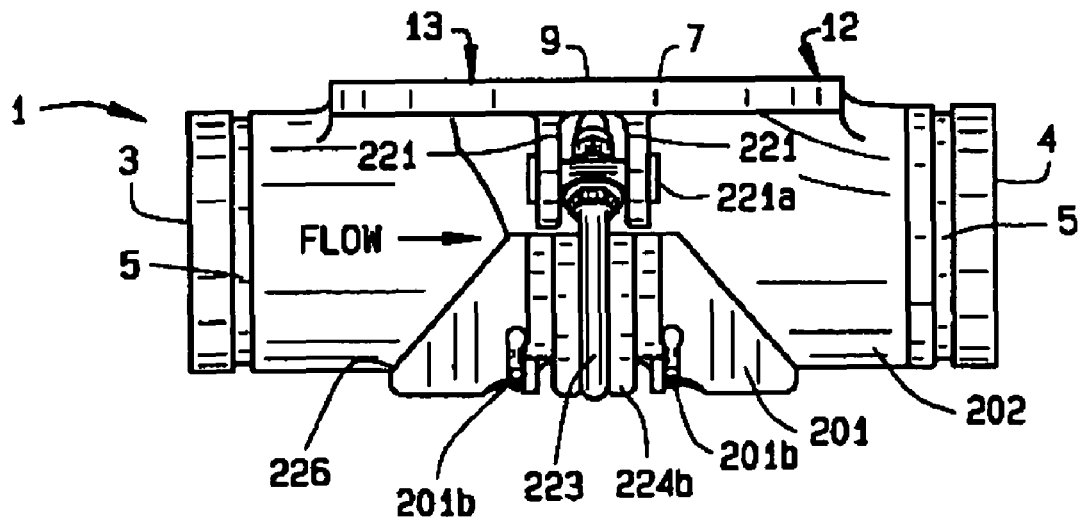

A further alternate embodiment of the invention is shown in FIGS. 16A, 16B as a low profile drop tee. Similar to FIG. 9, this embodiment of the drop tee has a horizontal pipe 202 with a drop opening 220 as later shown in FIG. 17 that is closed by a door. Opposite the door, this embodiment has a flange 7 with a top surface 7a outwardly from the horizontal pipe and the bottom surface 7b generally abutting the surface of the horizontal pipe tangentially. This low profile embodiment has more ground clearance that prior art tees with approximately ½ inch more between the lowest point of the door and the ground. The flange has an opening 9 that mates with a valve opening upon a hopper or bin. Upon more than the front half of the opening, the flange has a fore edge 12 that begins a flute that briefly curves in a concave manner from the diameter of the opening 9 to the diameter of the horizontal pipe. This curve begins immediately at the top surface 7a and then curves through a vertical distance equivalent to the thickness of the flange to attain a horizontal orientation at the horizontal pipe diameter. Opposite the fore edge, the flange has the aft edge 13 that generally provides a square shape. This embodiment effectively has no vertical pipe and thus a higher ground clearance, approximately 1½ inches higher than the previous embodiments. The fore edge and the aft edge generally have a height limited by the thickness of the flange 7.

Generally behind the transition towards the outlet, this embodiment has a pair of pivot ears 221 and an opposite pair of hinge ears 222 where each pair is collinear and extending perpendicular to the vertical pipe and to the horizontal pipe. Each member of a pair of pivot ears, FIG. 16A, and hinge ears, FIG. 16B, is coaxial and coplanar with its opposite counterpart. The pivot ears and hinge ears have a symmetric arrangement about the centerline that allows for changing the door position to either side of a trailer during usage. Then the hinge ear 222 extends outwardly from the vertical pipe along the same axis as the pivot ear 221 and provides a door hinge 225 with a bushing 225a and a coaxial pin 225b. A clevis pin spring retainer 225c may be optionally used to secure the pin 225b against dislodging from the bushings during rough movement of the invention beneath a trailer. Beneath the spring retainer, the figure shows a cam lever 224 of a generally elongated shape with two opposed ends. Particularly in FIG. 16A, one end is the pedal 224a that has an offset foot grip surface to receive a kick from a trucker during opening. Unlike the pedals of FIGS. 8, 15, this pedal has a substantial offset as shown, moving the foot pedal to the side and upwardly around the curve of the door which generally contributes to raising the ground clearance of this embodiment of tee.

Here in this figure, the door is in the closed position where the door 201 abuts a gasket 201a that compresses upon the lip 226 defining the drop opening 220 as described above. The door has preferably four holes 201e that admit legs 201b from the gasket through the door. The legs are generally elongated cylinders, round in cross section, that have a conically shaped bump out, or barb 201d, proximate the main portion of the gasket. The barbs 201d are generally spaced away from the gasket slight less than the door 201 thickness for a snug fit of the gasket to the door. The molded gasket has a generally elliptical shape with an open interior and four legs equally spaced upon the inside face of the gasket. The legs align the gasket upon the door in position for a tight seal. When closed, the door cooperates with the gasket as it seals to the horizontal pipe so that the inside surface of the door 201*c* is flush with the inside diameter of the horizontal pipe. The smooth closure of the door upon the horizontal pipe provides for minimal interruption in the flow of bulk material or change in the Reynolds number through the horizontal pipe with the door closed. The door hinge, shown here as at 222, allows the door to pivot upon one edge opposite the pivot ears 221 and opposite the aperture 224*d* but above the second aperture 224*e* of the cam lever from a closed to an open position.

Turning to FIG. 16B, opposite the pedal, the other end of the cam lever has a shoulder 224*b* generally curved upwardly partially around the door. Near the bottom of the shoulder, it has a groove 224*c* that receives the hook 223*b*. Near the top of the shoulder, an aperture 224*d* admits a pin 224*f*, through a bushing 224*g*, that pivotally connects the shoulder and the cam lever to the door 201. The cam lever also includes receives a safety pin, marking strap, or security seal through a second aperture 224*e* proximate the pedal 224*a* that secures the cam lever upwardly towards the hinge ear 222 to prevent inadvertent opening of the cam lever.

The drop tee low profile embodiment appears from the side in FIG. 16B where the flange 7 merges with a horizontal pipe 202. The horizontal pipe has an inlet 3 and an opposite outlet 4 each with a coupling slot 5 as before. The flange 7 has its opening 9 as before that receives bulk material from the hopper or bin above the drop tee. The flange has a top surface 7*a* that intersects along part of the perimeter of the opening with the vertical pipe defining the aft edge 13. Upon the reminder of the opening 9, the fore edge 12 defines the beginning of the brief flute 210. The flute curves the forward edge of the flange immediately towards the outlet and begins with a width that of the opening 9 in the flange and then narrows to the diameter of the horizontal pipe. In this embodiment, the flute extends in the direction of flow and towards the immediate vicinity of the coupling slot 5.

Generally centered slightly beneath the flange 7 and below straight edges 8, a pair of pivot ears 221 provides two parallel plates to which the cam bolt 223 secures upon the bushing 221*b* with its internal coaxial pin 221*a*. The cam bolt has its threaded end 223*a* passing through a hole in the bushing and the pin secured by two nuts equally spaced about the diameter of the bushing. The cam bolt 223 has threaded rod like connections that allow for adjustments in positioning of the door upon the horizontal pipe. The cam bolt extends outwardly from the horizontal pipe and bends around the shoulder 224*b* of the cam lever 224, generally outside of the door. The cam bolt extends downwardly so that its hook 223*b* engages the groove 224*c* of the cam lever 224. The cam lever extends within the depth of the door 201 to the opposite side of the drop tee. The door, as before, has an inverted saddle shape that matches the curvature of the horizontal pipe but also rises to allow for a recessed fit of the cam lever beneath the door but tight towards the tee. The door seals to the drop opening 220 upon the gasket 201*a* which compresses upon the lip 226. The lip and the drop opening curve upwardly, as in a saddle, to slightly above the centerline of the horizontal pipe. The perimeter of the door extends slightly outwardly from the lip causing a reduction in ground clearance below the door of approximately one inch.

Figure 17:
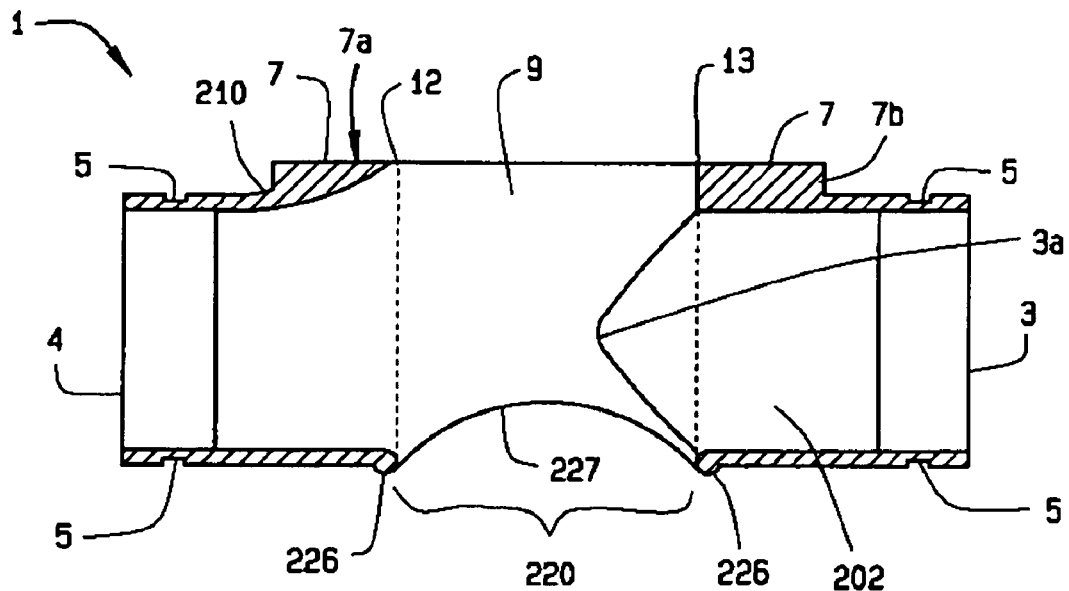
FIG. 17 provides a sectional view of the low profile drop tee.

Similar to FIG. 11, FIG. 17 shows a lengthwise sectional view of the low profile embodiment of the present invention. This embodiment has an opening 9 in the flange and a drop opening 220 located opposite each other that have the same diameter when seen from above. Bulk material passes through the opening, the horizontal pipe, and then the drop opening without any constriction and thus has faster unloading than in previous drop tees. The opening has a fore edge 12 generally located towards the outlet 4. The fore edge has a curve, generally concave, that begins at the top surface 7*a* and merges quickly with the inside surface of the horizontal pipe generally opposite the door 201. Opposite the fore edge, the opening in the flange has the aft edge 13 that extends perpendicular to the top surface and has no curvature towards the inlet. Then opposite the opening 9, this tee has the drop opening 220 bounded by the lip 226. The lip extends slightly outward from the surface of the horizontal pipe but provides a flush surface with the interior of the horizontal pipe. The lip extends around the opening as the door bead 227. The horizontal pipe 102 at the inlet 3 merges with the flange 7 along the upright curvi-linear feature 3*a*. Alternatively, the feature has a shape of one of parabolic, elliptic, or arcuate.

Figure 18:
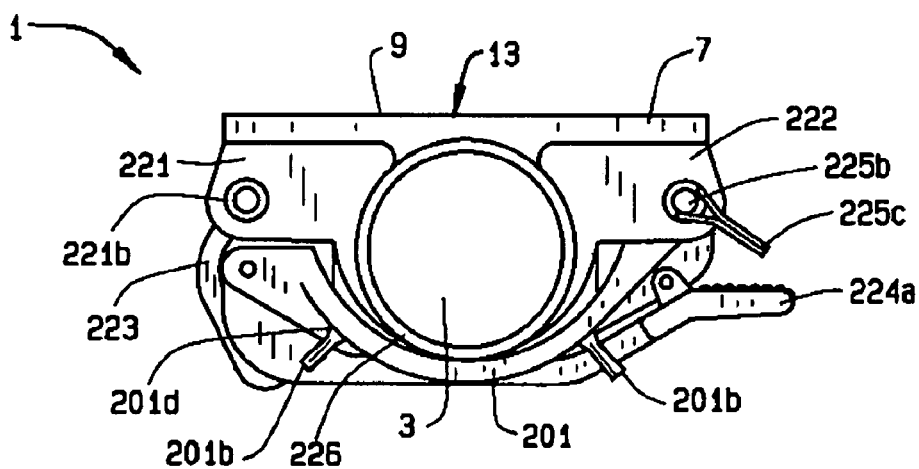
FIG. 18 shows an end view of the low profile drop tee.

And similar to FIG. 8, FIG. 18 illustrates an end view of the low profile embodiment. This embodiment has an opening as at 9 through the flange that receives bulk material from the hopper or bin. The opening has a known shape and width, round with a diameter in this description. Opposite the opening, this embodiment of the hopper tee has a door 201 that opens below a horizontal pipe 202 and has a drop opening 220 of the same width and shape as opening 9 as in the prior figure for unimpeded discharge of bulk material from the hopper or bin. Beneath the flange, the drop tee embodiment has no vertical pipe but does have the pivot ears 221 and the opposite hinge ears 222 both being collinear and extending perpendicular to the flange and to the horizontal pipe. The pivot ears 221 extend perpendicular beneath the flange and outwardly of the horizontal pipe and provide a pivot point for a cam bolt 223. The cam bolt turns upon a pin within bushing locating within apertures in the pivot ears. Then the hinge ears 222, locating opposite the pivot ears in a symmetrically arrangement, allow a cammed handle 224 with a safety pin, or seal wire, removed to pivot downwardly from the horizontal pipe and thus allow the door 201 to open. Then the hinge ears 222 also extend perpendicular and beneath the flange and outwardly from the horizontal pipe and provides a door hinge 225. The door hinge allows the door to pivot upon one end from a closed to an open position. The cam bolt has threaded rod connections, not shown but within the pivot ears, that allow for adjustments in positioning of the door upon the horizontal pipe. The door is shown here in the closed position where it rests upon the lip 226 defining the drop opening 220. The door seals upon a gasket 201, itself upon a raised bead 227, affixed to the lip. More particularly, the door seals to the horizontal pipe so that the inside surface of the door 201*a* is flush with the inside diameter of the horizontal pipe. The smooth closing of the door upon the horizontal pipe provides for less interruption in the flow of bulk material through the horizontal pipe with the door closed.

Figure 19:
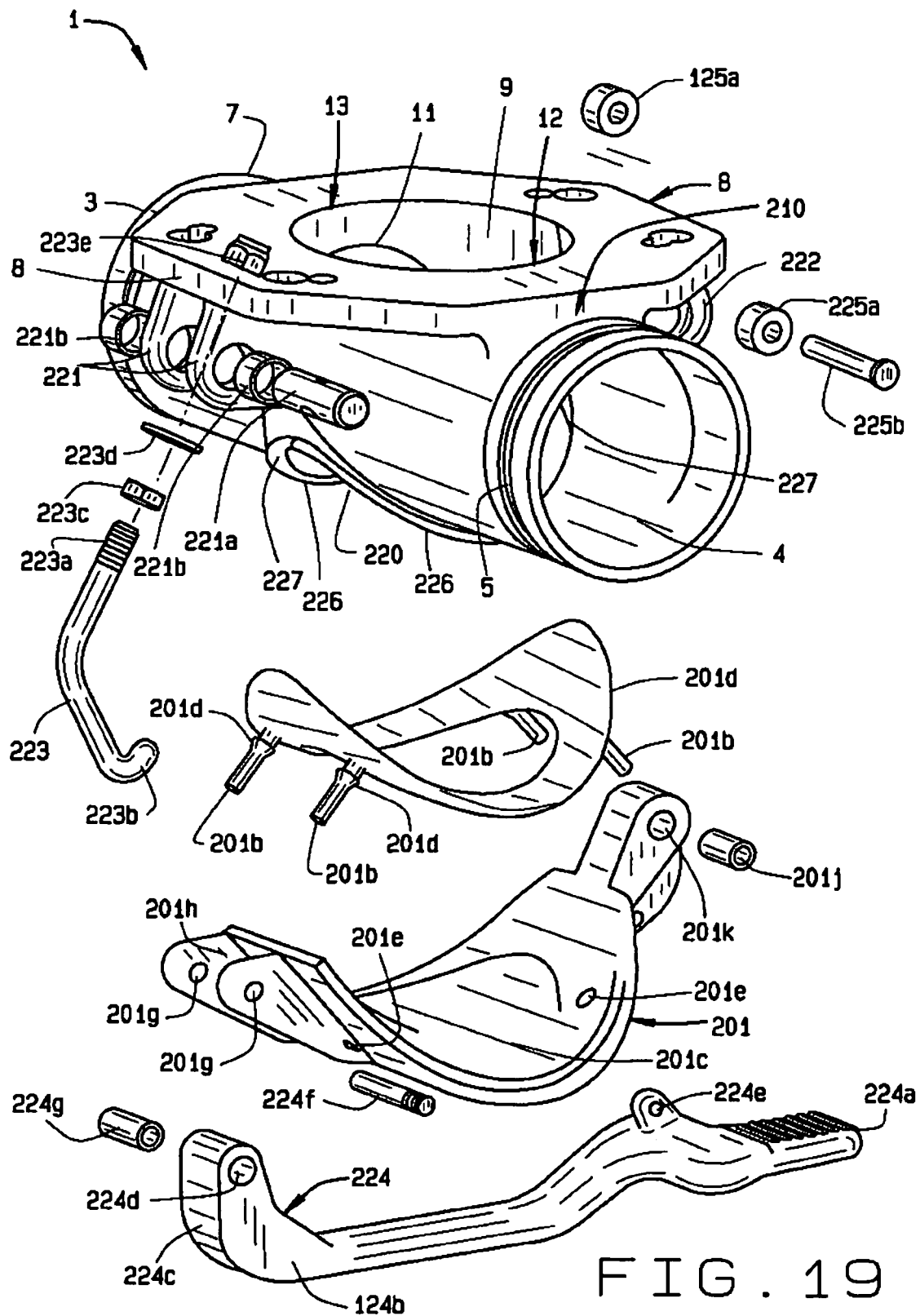
FIG. 19 provides an exploded view of the low profile drop tee.

And, FIG. 19 shows an exploded view of the low profile version of the drop tee components. This description begins at the bottom of the figure and moves upwardly through the invention. Here, the invention is in the closed position with the cam lever 224 in a generally horizontal orientation but perpendicular to the line of flow through the invention. The cam lever has a foot pedal 224*a* used by truckers and others to open the invention for discharge of product through the opening 9 in the flange 7 and then the bottom opening 220. As shown in FIG. 16A, the foot pedal is generally offset in the direction of the outlet 4 thus reducing ground clearance.

Inward from the foot pedal, the cam lever has a second aperture 224e that receives a seal, clip, or other marking device. Opposite the foot pedal, the cam lever has its shoulder 224b that has a greater width than the remainder of the cam lever and curves upwardly. The shoulder has a centered groove 224c generally centered therein that receives the hook 223b of the cam bolt 223 as previously described when the door is in the closed position and releases from the hook when the door is in the opened position (not shown). The shoulder curves upwardly above the level of the foot pedal and has an aperture 224d there through with an axis perpendicular to the length of the cam lever. The aperture receives a cam pin 224f that fits within a coaxial cam bushing 224g. The cam pin provides a pivotal connection of the cam lever to the door 201.

As before, the door has a generally saddle shape with an inside surface 201c having the same radius of curvature as the horizontal pipe 202. This horizontal pipe generally joins the flange without a vertical pipe as in the prior embodiment. The door curves upwardly and towards the cam shoulder in the figure and the door has two spaced apart door ears 201h that extend outwardly from the door. Each door ear has an aperture 201g there through that admits one cam bushing 224g between the door ears. Opposite the door ears, the door has the door tab 201j that has an aperture 201k there through that admits one door bushing 201f into the lone door tab. The door bushing cooperates with the hinge ears 222 for opening of the door from the horizontal pipe 202 and the remainder of this low profile tee. The door tab extends from the top of the curve of the door generally outwardly from the door and the horizontal pipe when the door is closed. Within the saddle portion of the door, that is down slope from the door ears 201h and the door tab 201j, at least two and preferably four holes 201e extend through the thickness of the door. The door holes 201e admit a part of the molded gasket 201a and are arranged symmetrically.

The molded gasket 201a also has a similar saddle shape as the inside face of the door. However, the molded gasket has a large opening there through for passage of product. The opening has a diameter of at least that of the opening 9 in the flange. Due to the saddle shape of the gasket, the opening attains a perimeter similar to a section through a spherical body. As described previously, the gasket compresses under closure of the door upon the lip 226 of the horizontal pipe. To keep the gasket in position upon the door and upon the lip when the door is closed, the gasket has two, and preferably four, legs 201b that extend radially outward from the gasket in the direction of the door. The gasket has a generally symmetrical shape. The legs align and enter the holes 201e which positions the gasket properly upon the door. Each leg has a barb 201d, or button head, with a generally inverted tapered shape with maximum diameter towards the gasket tapering to the leg diameter away from the gasket. Each barb is also spaced down the leg a distance similar to the depth of the hole 201e. During installation, a worker pushes the leg into the hole until the barb engages and repeats that for each leg. To remove the gasket, the worker pulls on the leg, stretching it while narrowing it enough for the barb to pass back through the hole 201e. Removing the gasket aids the trucker or other worker in cleaning the door and avoids cross contamination of loads. The removable gasket can be removed and cleaned in contrast to prior art drop doors that remained connected to a tee which hindered cleaning and raised the chance of cross contamination with its risk of rejecting a load.

The door with its installed gasket rotates upon its door tab 201j within the hinge ears 222 of the main portion of the tee. The hinge ears are mutually parallel and spaced apart generally proximate the top of the lower pipe 202. Each hinge ear has its own aperture that admits a hinge ear bushing 225a that receives a spring clip pin 225 that passes through the bushing 225a and the door bushing 201f and allows the door to pivot away or to drop from the tee, as during unloading. Opposite the hinge ears 222, the tee has the pivot ears 221 where each pivot ear has its own aperture. The apertures of the pivot ears and the hinge ears are spaced symmetrically about the line of flow of the invention to allow for reverse installation of the door if needed in the field. The door of the low profile tee can be installed for right side or left side of trailer usage. Each aperture in a pivot ear receives a pivot bushing 221b that in turn admits a cam pin 221a generally centered within the pivot ears. The cam pin has a diametrical hole through its centered that admits the threaded end 223a of a cam bolt 223. The threaded end has a jam nut 223c and a washer 223d inside of the jam nut located outside of the cam pin and a locking nut 223e inside of the cam pin. The locking nut secures the cam bolt upon the cam pin for hinge action of the cam bolt 223 to the cam lever 224 as previously described.

Inside of the pivot ears and the hinge ears, the invention has the lower pipe 202 with its outlet 4 to the right in this figure. Inside of the outlet, one can view a portion of the door bead 227 denoting the opening 220 in the bottom of the lower pipe. The outlet has its coupling slot 5 inward of the outlet and the lower pipe has the saddle shaped lip 226 below the hinge ears and the pivot ears. The lower pipe continues rearward to an opposite coupling slot 5 and the inlet 3. The lower pipe effectively has no vertical pipe in this embodiment as it merges with the flange 7. One can see the flute line 11 intersecting with the circumference of the lower pipe slightly below the aft edge 13. The lower pipe 202 in cooperation with the flange 7 at the forward edge 12 has its brief flute 210 locating upon the downstream portion of the tee. The flute begins immediately at the top surface 7a of the flange at the forward inside edge 12. Opposite the forward edge 12, the flange has an aft edge 13 generally square, or a right angle edge. The flange has two exterior, mutually parallel squared edges 8, generally parallel to the length of the lower pipe 202. And the flange 7 extends in a plane generally parallel to the direction of flow and to the length of the lower pipe while it has a pattern of holes there through for mechanical connection to a valve body or directly to the hopper, or bin.

Proceeding to FIG. 20, a hopper H suspends below a transporter such as a trailer or railcar, comes to a narrow neck at the bottom of the hopper, and has a flange F generally planar and parallel to the diameter of the hopper. The flange extends outwardly from the neck and has a pattern of holes there through. The flange shape and width are generally standardized by the hopper manufacturers. The present invention in this embodiment has a first collar 300 having a length less than the diameter of the flange F and a width generally that of the diameter of the flange F. In the preferred embodiment, the first collar has a generally beveled cross section, as at 300a, that abuts the tapered wall of a hopper generally slightly above the flange F. In an alternate embodiment, the first collar has a generally C shaped cross section with two parallel spaced apart flanges joined by a web at the ends of both flanges. Returning to the preferred embodiment, the first collar slips over the flange F of the hopper. Outwardly, the first collar has a hinge flange 301 extending below the main portion of the first collar. The hinge flange has an aperture 302 there through. Opposite the hinge flange, the first collar has a threaded socket 303 that receives an appropriately sized bolt 304 turned axially therein. The longitudinal axis of the socket is generally parallel to the hinge flange. The first collar has a socket locating upon each side of the first collar as later shown in FIG. 2.

Figure 20:
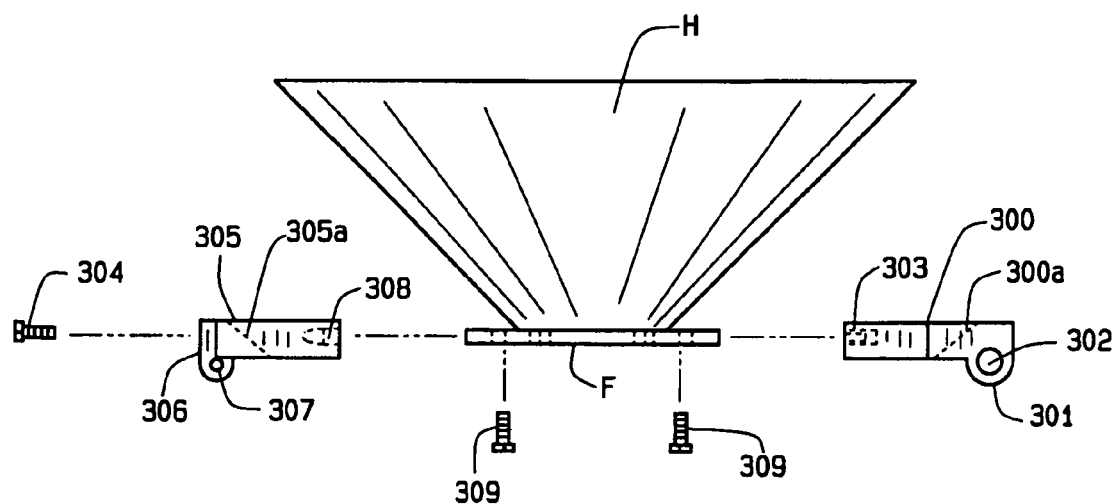
FIG. 20 shows a side view of the collars of the present invention engaging the flange of a hopper.

On the other side of the hopper in FIG. 20, the invention has a second collar 305 similar to the first collar. In the preferred embodiment, the second collar also has a generally beveled cross section, as at 305a, that abuts the tapered wall of a hopper, slightly above the flange F. In an alternate embodiment, the second collar has a generally C shaped cross section with two parallel spaced apart flanges joined by a web at the ends of both flanges. Returning to the preferred embodiment, the first collar slips over the flange F of the hopper and aligns with the cross section of the first collar as later shown. Outwardly, the second collar has a bolt flange 306 extending below the remainder of the second collar, generally to the same elevation as the hinge flange 301. The bolt flange has an aperture 307 through it though of slightly less diameter than the aperture 302 of the hinge flange. Opposite the bolt flange, the second collar also has a threaded socket 308 that receives the bolt 304 secured thereto. The longitudinal axis of this socket 308 is generally parallel to the bolt flange and aligns with the socket 303 on the first collar. The second collar has a socket locating upon each side to mate with the sockets of the first collar. The present invention provides at least two and preferably four alignment bolts 309 that pass upwardly towards the flange F. During usage, a worker places the collars 300, 305 upon the flange F and pushes them together for hand tightening. With the collars engaged, the worker rotates them until the holes of the flange F align with holes as in FIG. 21. The worker then inserts the alignment bolts through the holes in the lower flange of each collar, then the holes in the hopper flange F, and then matching holes in the upper flange of each collar. The holes in the upper flange are generally tapped to hold the bolts 309 securely.

Figure 21:
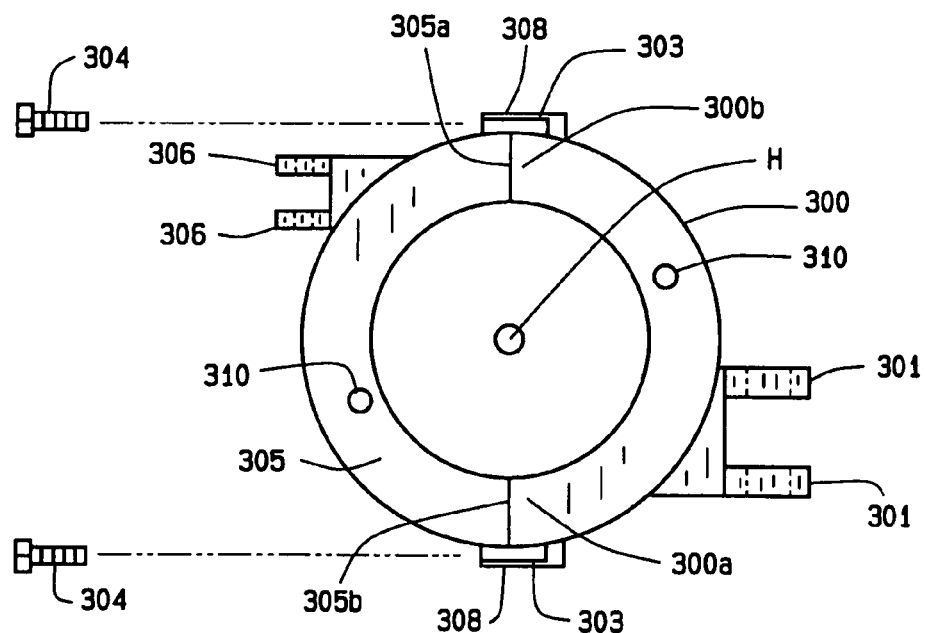
FIG. 21 shows a top view of the collars engaged and surrounding the flange of a hopper.

With the invention in usage, FIG. 21 shows the first collar 300 and the second collar 305 brought together upon the hopper flange F. This top view has the hopper H locating within the collars and the collars open upon their mutual interior for the delivery of bulk materials there through. The first collar 300 has a generally semi-circular, half arc shape in plan with two opposite ends, a first end 300a, and a second end 300b. The ends generally demarcate the diameter serving as the length of the first collar. The ends generally align with a diameter of the hopper flange. The first collar has two hinge flanges 302 proximate the first end 300a. The hinge flanges are mutually parallel, slightly inward from the first end, and perpendicular to a diameter extending across the ends. Along the curve of the first collar and away from the hinge flanges, the first collar has one tapped hole 310 also away from a centerline of the first collar. This tapped hole receives a threaded alignment bolt 304 inserted from below as previously described. Proximate each end, the first collar has the sockets 303, each generally tangent to the remainder of the first collar.

The sockets 303 of the first collar align with the sockets 308 of the second collar 305. The sockets 308 are located tangent to the ends of the second collar, a first end 305a and a second end 305b. The ends denote the limits of a semi-circular, half arc shaped second collar 305. The second collar has two bolt flanges 306, proximate this first end 305a. The first end of the second collar adjoins the second end of the first collar. This positions the hinge flanges 301 generally offset from the bolt flanges 306. The hinge flanges and bolt flanges are mutually parallel as shown in FIG. 21 but spaced apart to define the offset feature of this invention. The bolt flanges 306 themselves are also mutually parallel, slightly inward from the first end, that is towards the hinge flanges, and perpendicular to a diameter extending across the ends. Away from the bolt flanges and along the curve of the second collar, the second collar also has a tapped hole 310. This tapped hole receives a threaded alignment bolts 304 as described earlier.

During usage, a worker places the collars 300, 305 upon the flange F and pushes them together for hand tightening. The worker then tightens the bolts 304 into the sockets 303 upon both sides of the invention using a wrench or other tool. With the collars engaged, the worker rotates the invention until the holes of the flange F align with holes 310 in the collars. The worker then inserts the alignment bolts through the holes in each collar and through the holes in the hopper flange. The alignment bolts secure the invention against rotation upon the hopper flange while the clamping action of the two collars secures the invention against dropping under gravity and product unloading forces.

Figure 22:
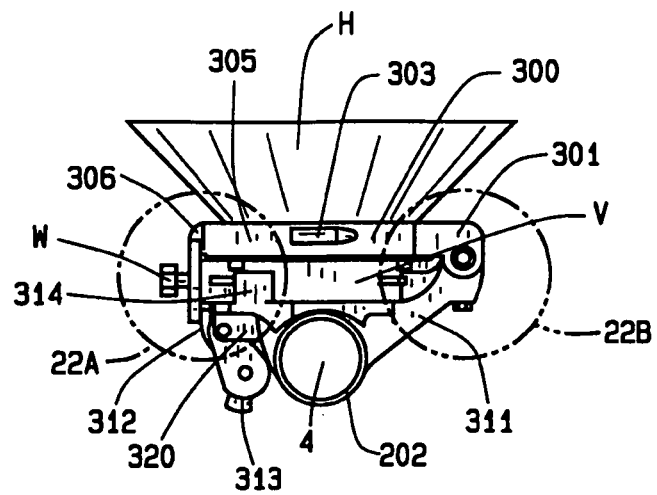
FIG. 22 describes a front view of the present invention installed upon a hopper and in the closed position.

With the collars secured, the present invention then attains a closed position shown in FIG. 22. The first collar 300 adjoins the second collard 305 upon the hopper flange F. The bolts 304 mutually secure the collars and then the alignment bolts position the collars upon the flange so that a valve body V may be access by a worker from the side of the hopper. The valve body V located beneath the collars and above the tee portion of this assembly. The hinge flanges 301 pivotally connect with a hinge arm 311 extending from a horizontal pipe 202. The hinge arm extends outwardly and above the horizontal pipe to fit the width and height of a valve body inside of the hinge arm. Opposite the hinge arm, the bolt flanges 306 provide pivotal securement for a hook bolt 312, here shown partly concealed by the valve handle W. The hook bolt extends downwardly from the second collar, across the height of the valve body and to the vicinity of the horizontal pipe 202 where the hook bolt engages a cam 313 that pivots from the horizontal pipe. The cam pivots itself upon bight flanges 320 that extend outwardly from the flange as later described. Here the cam is pivoted inwardly toward the horizontal pipe thus securely closing the horizontal pipe upon the valve body, which secures against the collars. The valve body remains in proper orientation upon the horizontal pipe by at least one lug 314.

Figure 22A:
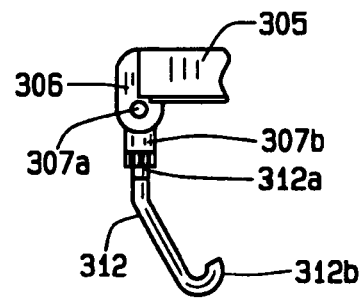
FIG. 22A illustrates a detailed view of the cam bolt of the present invention.

Looking more closely, FIG. 22A describes the pivotal connection of the hook bolt 312 to the bolt flanges 306. The bolt flanges extend outwardly from the second collar and provides a pivot point for a pin 307a within a bushing 307b for the hook bolt 312, wherein the bushing is generally a polymer. The hook bolt has a threaded end 312a in a bolted connection into the bushing and opposite the threaded end it has a hook 312b. Between the threaded end and the hook, the hook bolt has an off center bend, generally inward, defined by the threaded end approaching the hook or a generally convex shape as shown in the figure. The hook bolt 312 engages the cam 313 pivotally connected to the horizontal pipe that allows a handle to pivot downwardly and close the cam against the horizontal pipe thus closing the assembly so that a valve body is retained therein with a minimum of labor from workers, as during cleaning between select loads.

Figure 22B:
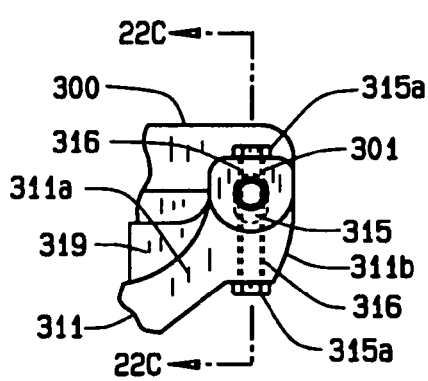
FIG. 22B illustrates a detailed view of the hinge of the present invention, generally offset from the cam bolt.

Opposite FIG. 22a, FIG. 22b shows the pivoting hinge mechanism in more detail. The hinge arm 311 extends from the horizontal pipe 202 and narrows slightly at a wrist 311a. The wrist then turns upwardly and widens into a knuckle 311b that also extends further upwardly adjacent to the hinge flanges 301. The knuckle receives an adjusting bolt 315 that extends through an aperture 316. The aperture passes through the height of the knuckle. The knuckle though does not extend for the full height of the hinge flanges. The adjusting bolt has nuts 315a upon both ends that a worker turns to adjust the position of the hinge are relative to the aperture 301 of the hinge flange 302. Vertical adjustments of the hinge arm allow for a tighter and more accurate fit of the horizontal pipe upon the valve body and then to the hopper flange to prevent leakage of product and accommodate worn valve and pipe components.

Figure 22C:
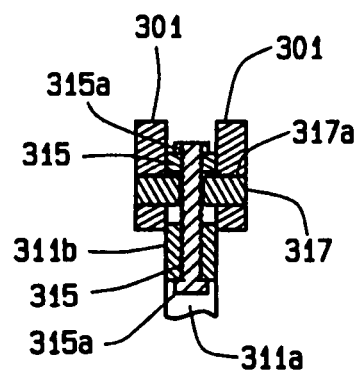
FIG. 22C illustrates a sectional view through the hinge of the present invention.

Looking in greater detail, FIG. 22c further shows the knuckle and its vertical adjustment capability and pivotal connection of the adjusting bolt 315 to the hinge flanges 301. The hinge flanges extend outwardly from the first collar to provides a pivot point for a pin 317 within a bushing 317a, generally polymer. The bushing fits within the hinge flanges coaxial with the apertures 302. The pin has a hole, generally centered and extending across the diameter of the pin. The hole in the pin receives the adjusting bolt 315 so that the adjusting bolt is generally perpendicular to the pin 317. During assembly of the invention, the bushing 316a is placed in an appropriately sized aperture in the knuckle then the knuckle is placed within the hinge flanges so that the bushing aligns with the apertures 301. Then the pin 317 is placed through the apertures and the bushing. The pin is then rotated so that the hole aligns with the aperture through the knuckle. A system of manufacturers marks and notches can facilitate this assembly. With the bushing aligned, the adjusting bolt is inserted into the aperture, the bushing, the pin and onwards through the knuckle. With the adjusting bolt having both ends extend from the knuckle, nuts are placed upon the adjusting bolts. The hinge arm, and hence the horizontal pipe, attain a radius of curvature during opening of the assembly defined by where, along its length, the adjusting bolt intersects the pin. Turning the nuts 315a upon the adjusting bolt 315 moves the knuckle towards and away from the pivot pin 317. As the adjusting bolt moves towards the hopper, the hinge arm attains a smaller radius of curvature. As the adjusting bolt moves away from the hopper, generally downwardly, the hinge arm attains a larger radius of curvature.

Adjustment of the hinge arm's radius of curvature adjusts the fit of the horizontal pipe upon the valve body. The adjusting bolt through the hinge arm and horizontal pipe accommodates valve bodies of various heights and degrees of wear. As this invention includes only one hinge, the adjusting bolt provides the fine tuning of the horizontal pipe's fit usually performed by a second hinge, not present here. The hook bolt has a threaded end 312a in a bolted connection into the bushing and opposite the threaded end it has a hook 312b.

Figure 23:
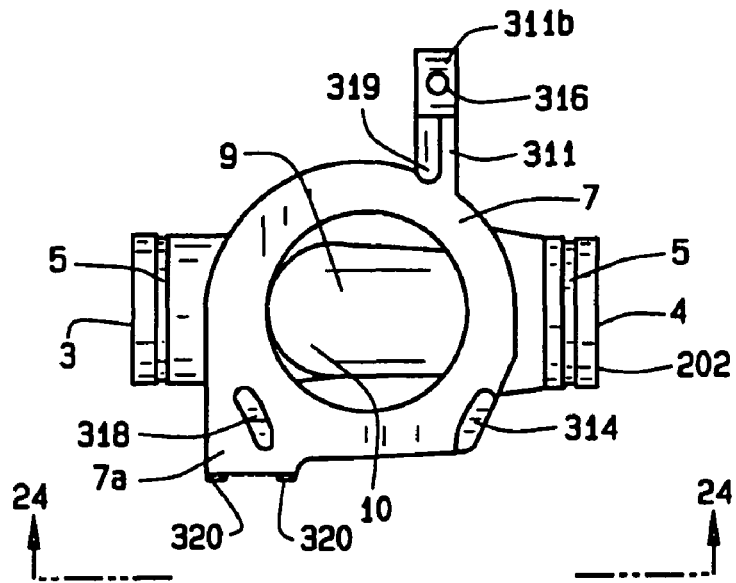
FIG. 23 shows a top view of the flange of a tee of the present invention.

Opposite the hinge arm, on the other side of the horizontal pipe and the other side of the connected collars, a hook bolt pivots from the second collar and engages a cam that itself engages the horizontal pipe 202. The horizontal pipe has a flange 7 shown from above with a valve body absent in FIG. 23. The horizontal pipe 202 has a round cross section of a known diameter. The horizontal pipe has two opposed ends, one end being an inlet 3 that receives material sent into the invention under pneumatic pressures and the opposite end being an outlet 4 that discharges material from the inlet and material unloaded from a hopper, or bin, into the horizontal pipe. The inlet and the outlet each have a perimeter slot 5 for coupling the invention 1 into a pneumatic system for unloading. The coupling slots 5 generally extend around the entire circumference of the horizontal pipe proximate the inlet and the outlet.

Generally centered upon and perpendicular to the horizontal pipe, a flange 7 extends outwardly from the pipe in a planar form that is parallel to the longitudinal axis of the lower pipe and generally tangential to the pipe. The flange has a top surface 7a and a pattern of lugs thereon that retains a valve body placed thereon where the valve body is commonly used in the bulk material hauling industry. In this embodiment, the flange has a truncated round shape where the flange has a somewhat straight edge parallel to the length of the horizontal pipe, locating generally below the second collar and for engaging the hook colt using cam action. Centered upon the flange, an opening 9 matches the inside diameter of the valve for passage of product there through. The opening shows the flute 10 that accelerates the passage of product through the angle between the flange and the horizontal pipe. These figures including the horizontal pipe generally show a low profile version however, the Applicant foresees additional embodiments where the horizontal pipe includes a vertical pipe, bottom drop opening, and reinforced flange as described above.

Returning to the flange 7, the flange extends outwardly from the horizontal pipe. Upon the somewhat straight edge, the flange has a first lug 314 and a spaced apart, complementary second lug 318. The first lug is at an angle to the longitudinal axis of the horizontal pipe and is located flush with the outer edge of the flange generally towards the outlet of the horizontal pipe. From above, the lug has a generally rectangular cross section with rounded corners. Spaced away from the first lug, the second lug 318 has a similar shape and cross section as the first lug and is at an angle to the longitudinal axis of the horizontal pipe. However, the second lug is located in a mirror image in relation to the first lug. The second lug and the first lug are generally equally spaced about the opening 9 and sufficiently spaced to receive the curvature of the valve body when installed therein as later shown.

Unlike the first lug, the second lug locates inwardly from the nearest outer edge of the flange. The flange 7 extends outwardly from the second lug and generally tangent to the second collar as in the vicinity of 7a. This section of flange, 7a, provides securement for the pair of hook flanges 306 extending there below. The hook flanges are generally perpendicular to the longitudinal axis of the horizontal pipe. And the outer hook flange attains an orientation generally tangential to the flange.

The flange proceeds from the second lug and around the opening from a maximum width proximate the second lug and narrowing upon the opposite side of the horizontal pipe. Opposite the two lugs and towards the first lug, the flange merges with the hinge arm 311. The hinge arm extends perpendicular to the longitudinal axis of the horizontal pipe and away from the flange. The hinge arm turns upwardly and has its knuckle 311b outwardly from the horizontal pipe. The knuckle has the aperture 316 extending perpendicular to the axis of the hinge arm. Between the knuckle and the flange, the hinge arm supports a third lug 319. The third lug has a generally rectangular cross section. The third lug has less thickness than the hinge arm and has a slightly rounded edge locating towards the opening 9. The third lug cooperates with the first lug and the second lug to retain a valve body placed therein. The third lug particularly prevents the valve body from flipping outwardly from the flange as during opening of the invention.

Figure 24:
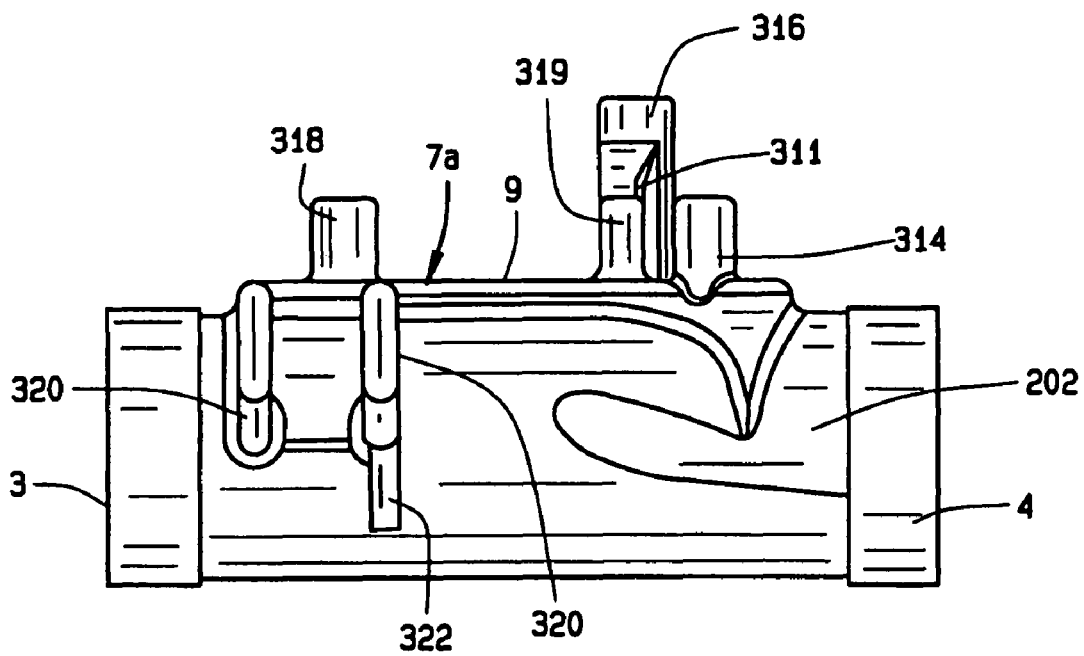
FIG. 24 shows a side view of the tee with the hinge in the background.

During usage of the invention, a worker would view the horizontal pipe and flange alone as shown in FIG. 24. The horizontal pipe 202 has an inlet 3, an outlet 4, perimeter grooves 5 near the inlet and the outlet, a flange 7 tangential to the horizontal pipe and defining the top of the pipe, a flange surface 7a with an opening 9 there through for product, and the hinge arm 311. Though this figure shows a low profile version without a vertical pipe and with a flange adjacent and tangent to the horizontal pipe and with a flute line 11, the Applicant foresees usage of this invention upon other tees including those with a vertical pipe. Returning to FIG. 24 the flange 7 is generally tangential to the horizontal pipe 202 and has its surface 7a outwardly from the pipe. From the left, the flange 7 has the bight flanges 320 extending from the horizontal pipe upwardly to the underside of the flange 7 opposite the surface 7a. The bight flanges are generally parallel as shown. Generally above the bight flanges, the flange 7 has the second lug 318 extending upwardly from the surface 7a. The second lug has its edges rounded over and its angle orientation thus presenting a somewhat square shape in this view though the lug itself is rectangular as previously shown. The bight flange 320 inwardly from the inlet, or closer to the outlet, has a coplanar extension 322 that continues downwardly from the flange 7. The extension and its appurtenant bight flange are located slightly forward of the second lug.

On the other side of the opening 9 towards the outlet 4, the third lug 319 appears in the background with its rounded end shown. The third lug has approximately half the thickness of the hinge arm 311. The hinge arm continues behind the third lug and extends upwardly from the three lugs into the knuckle 311b. The knuckle has an elevation above the flange of approximately double that of the lugs. In the foreground rightward of the hinge arm and nearest the outlet, the flange 7 has the first lug 314 extending upwardly from the surface 7a. The first lug also has its edges rounded over and its angle orientation opposite that of the second lug thus presenting a somewhat square shape in this view though the lug itself is rectangular as previously shown.

Figure 25:
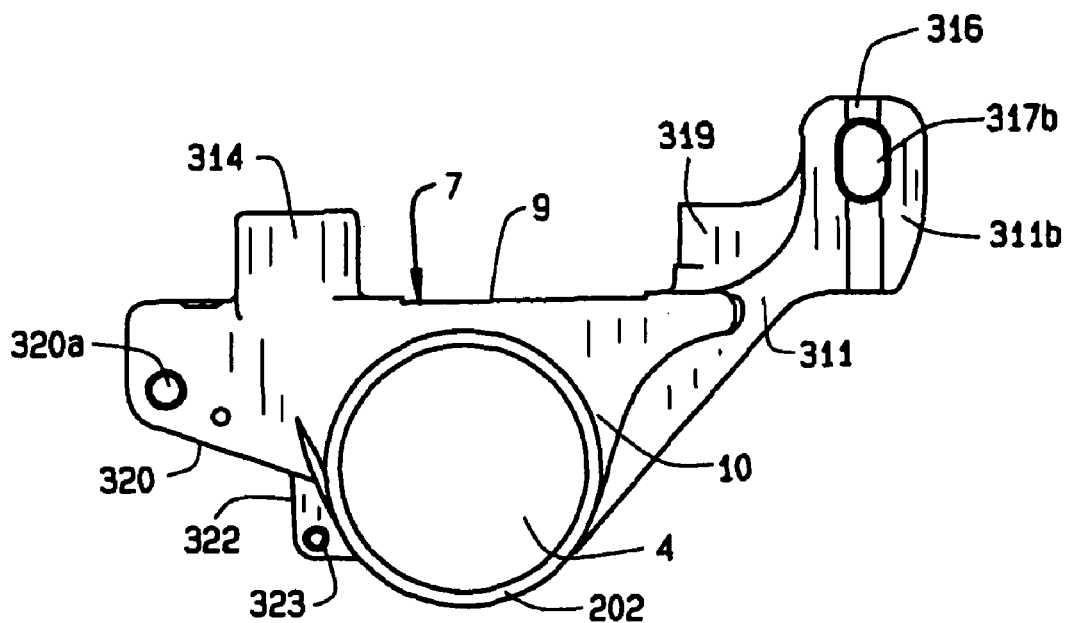
FIG. 25 shows another front view of the invention, more particularly the tee with the hinge to the right.

Turning the horizontal pipe 202, FIG. 25 shows the horizontal pipe from the end with the outlet 4 in the foreground. The horizontal pipe 202 has a generally round cross section that widens in the vicinity of the flute 10. The flute has its opening 9 within the flange 7. Here shown to the left of the figure and the pipe, the flange has the first lug 314 extend from the surfaced 7a generally away from the horizontal pipe. The first lug shows its rounded ends and angular orientation with its generally square shape in this view. The first lug is generally inward from the bight flanges 320 shown below the flange 7. The bight flanges are generally perpendicular to the horizontal pipe and extend downwardly approximately one third the height of the pipe. The bight flanges include an aperture 320a upon which pivots the cam as previously described. The bight flange shown in this figure is located towards the outlet 4 and inwardly from the inlet 3. This bight flange has the extension 322 continuing downwardly. The extension has a width outwardly from the pipe 202 less than the width of the first lug 314. The extension has a height from the main portion of the bight flange of approximately 20% to 40% of the outside diameter of the pipe 202. The extension has a rounded corner locating outwardly from the pipe and the adjacent bight flange. The rounded corner has its aperture 323 there through and spaced inwardly from the outer edge of the extension as shown. The aperture receives a safety pin, as at 324 later shown in FIG. 29.

To the right of the figure and on the opposite side of the opening and pipe, the hinge arm 311 extends from the pipe 202 upwardly and outwardly to the flange and then further upwardly and outwardly from the flange. The hinge arm begins at the elevation where the flute merges completely with the pipe and then extends upwardly at an approximately 45 degree angle. The hinge arm and the first lug are generally in the foreground of this view while the bight flanges are in the background. The hinge arm extends above the flange and outward from the flange while showing the integral third lug 319. The third lug is generally perpendicular to the flange and extends outwardly from the flange and the opening into the hinge arm. The hinge arm continues outwardly and upwardly from the third lug into the knuckle 311b. The knuckle is generally twice the height of the lugs and extends outwardly from the third lug at least half the length of the third lug. In this view, the knuckle has a generally vertical aperture 316 centered in the knuckle that extends through the height of the knuckle and admits the adjusting bolt as previously shown. Locating slightly above the elevation of the third lug, a bushing aperture 317b extends through the knuckle with an axis parallel to the longitudinal axis of the pipe. The bushing aperture is elongated with rounded ends.

Figure 26:
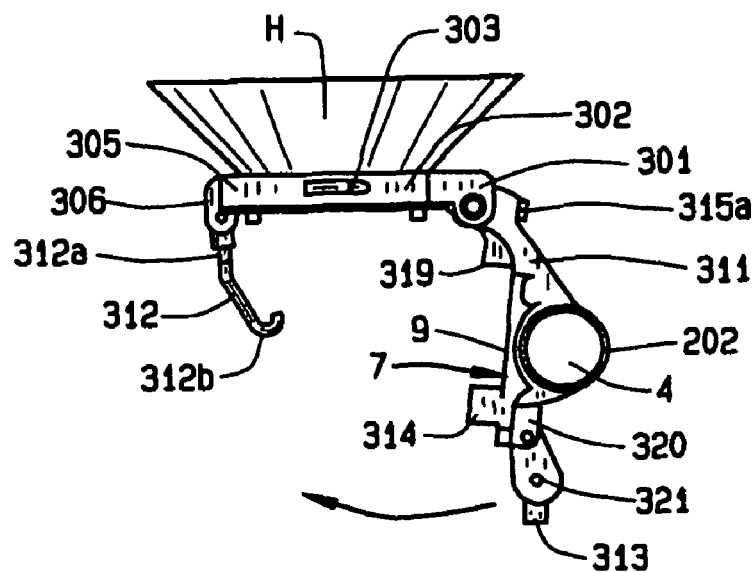
FIG. 26 describes a front view of the invention in the open position while preparing to close.

Having described the collars, the hook bolt, the hinge, the flange, and related items, the following figures illustrate the operations of the invention in relation to a hopper H. FIG. 26 shows the invention installed upon a hopper flange F ready to receive a valve V. The collars 302, 305 have been fitted upon the flange and surround the entire perimeter of the flange once secured by bolts 304 into sockets 303. The hook bolt 312 depends from the hook flanges 306 of the second collar with its bight 312b open. The hinge flanges 301 of the first collar 300 receive the knuckle 311b of the hinge arm 311. The knuckle secures the adjusting bolt 315 into its aperture 316 and through a bushing 317. Here the knuckle and hinge arm are shown rotated approximately 90 degrees outwardly from the hopper H wherein the pipe 202 is outside of the first collar. The hinge arm extends from the knuckle and produces the third lug 319 which leads to the flange 7. The flange spans away from the hinge arm as the hinge arm extends to the horizontal pipe, generally to a distance more than half the diameter of the pipe from the flange. The flange continues across the pipe and produces the first lug 314. The third lug and the first lug extend oppositely and away from the pipe. The flange extends slightly beyond the first lug and has the bight flanges 320 extending from the flange towards the pipe. The bight flanges hingedly connect to the cam 313. The cam has a pin 321 there through of a diameter comparable to the bight 312b of the hook bolt. Here the horizontal pipe is shown open with the cam beginning to move towards the bight as during the transition from the open position to the partially open position of the invention.

Figure 27:
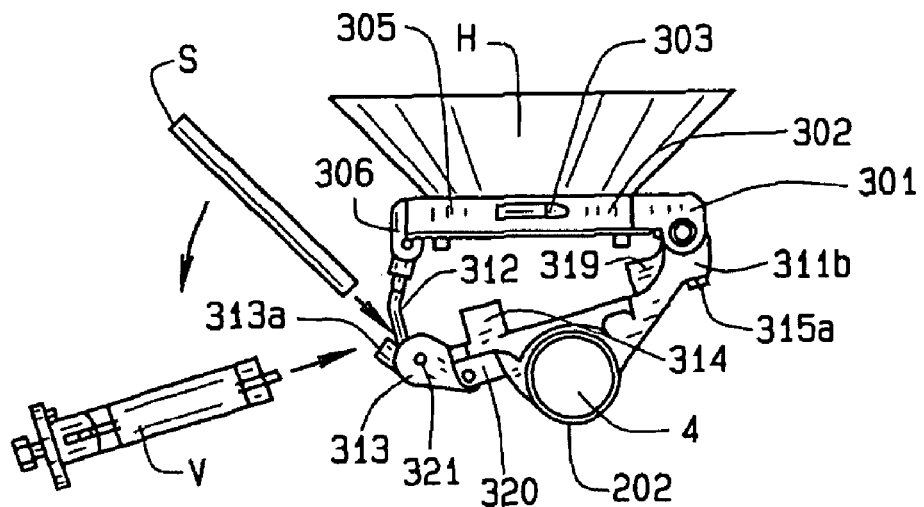
FIG. 27 then provides a front view of the invention during closing with the cam bolt engaged and the flange ready to receive a valve body; and, FIG. 28 illustrates a front view of the invention when closed upon a valve body and secured by a cam; and, FIG. 29 provides an exploded view of the components of the invention.

Now FIG. 27 shows the invention in the partially open position which has great utility to truckers and plant personnel. In the partially open position, the hook bolt 312 has engaged the cam 313 thus holding the horizontal pipe, more particularly the flange 7, in an angled relation to the hopper. The bight 312b has slipped up under the pin 321 to secure the pipe at a second point, the first being the hinge as at 301, so that the pipe remains supported beneath the hopper though open. This angled relation of the pipe relative to the hopper provides enough room for the positioning of a valve V between the lugs 314, 318, 319 and the seating of the valve upon the flange 7 where the valve aligns with the opening 9 inside of the flange and the opening of a hopper flange. The cam 313 of the present invention has its own small socket 313a that admits a handle S for turning of the cam to open and to close the present invention. Here the handle S is advanced towards the cam after the valve V has been placed therein.

Figure 28:
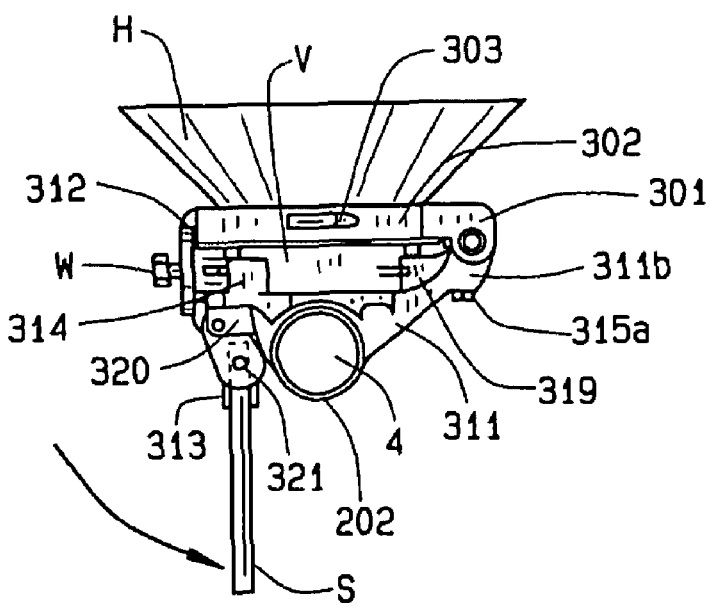

And, FIG. 28 shows the handle S within the socket 313a of the cam and the handle rotating downwardly and towards the pipe. In rotating the handle towards the pipe through approximately ninety degrees, the cam pulls the bight 312b of the hook bolt and a reaction force from the bight flanges 320 lifts the pipe upwardly to the bottom face of the valve. A little further turning of the handle engages the offset position of the cam against the surface of the pipe and closes the pipe snugly upon the valve. The snug closure strongly resists inadvertent opening of the invention as the assembly endures vibrations, rocks, abuse, and other hazards of road transportation. Upon fully closing the invention, the invention appears as shown in FIG. 22.

Figure 29:
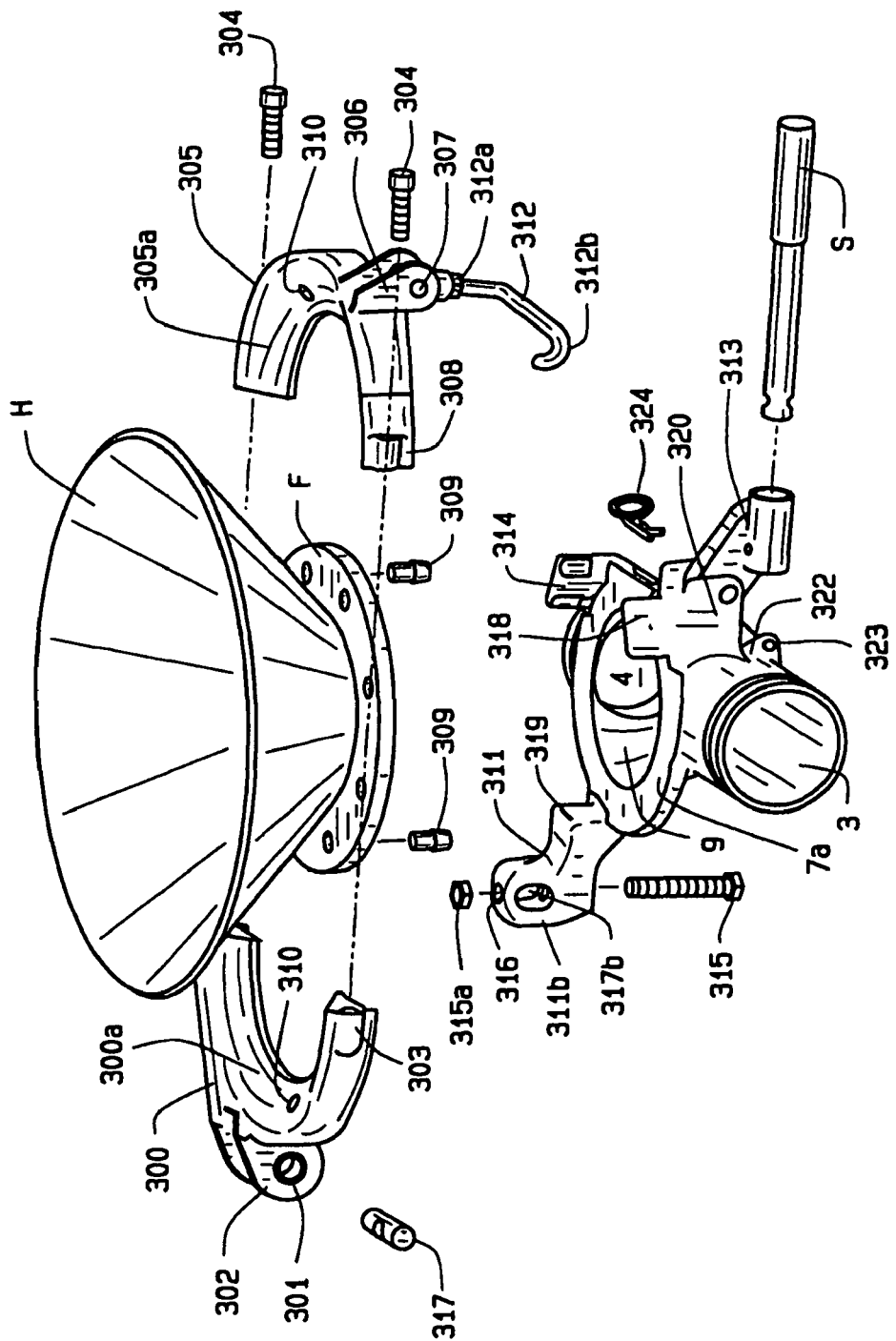

As the various component parts and operating positions of the split collar with offset hook and hinge hopper assembly have been described, FIG. 29 provides an exploded view of the present invention showing the relationship of the component parts. A hopper H has a depending flange F having a predetermined pattern of holes therein. A beveled first collar 300 has a pair of mutually parallel hinge flanges 301 offset from the center of the semi-circular collar towards the background of this figure. The hinge flanges have coaxial apertures 302 that admit a bushing 317. A tapped hole 310 extends through the first collar, spaced away from the hinge flanges, and receives an alignment bolt 309 when the first collar abuts the hopper while resting upon the flange. The bevel of the first collar matches the angle of the hopper. Opposite the first collar, a beveled second collar 305 has a pair of mutually parallel hook flanges 306 offset from the center of the semi-circular collar, offset from the hinge flanges 302, and locating towards the foreground of this figure. The hook flanges have coaxial apertures 307 that admit a bushing upon which turns a hook 312. Another tapped hole 310 extends through the second collar, spaced away from the hook flanges, and receives an alignment bolt 309 when the second collar abuts the hopper while resting upon the flange and the first collar. The bevel of the second collar matches the angle of the hopper. The two collars connect around the hopper by bolts 304 through their respective sockets 303, 308.

Beneath the alignment bolts 309, this FIG. 29 provides the pipe 202 with its tangential flange surface 7a having an opening 9 there through for bulk material. The pipe has an inlet 3, foreground, and an opposite outlet 4, background. Generally centered upon the pipe, a flange has a surface 7a generally tangent to the pipe and defining a plane parallel to the direction of flow. Upon the flange, three lugs provide securement for a valve body placed within them. Towards the right of the pipe, the flange has the first lug 314, background, and the second lug 318, foreground. These two lugs are angled inwardly and have a straight of the flange between them. Opposite these two lugs, the flange has the third lug 319 generally perpendicular to the longitudinal axis of the pipe. The third lug continues outwardly as the hinge arm 311 away and upwardly from the pipe. The hinge arm has a knuckle 311b outermost from the pipe that permits a hinged connection of the pipe to the first collar. The knuckle has a vertical aperture 316 that admits an adjusting bolt 315 with adjusting nuts 315a upon each end of the bolt. The knuckle also has an opening 317b for the bushing 317 where this opening is generally perpendicular to the aperture 316.

Opposite the hinge arm 311 and beneath the second lug 318, a pair of bight flanges 320 extend perpendicular and downwardly from the flange 7. The foreground bight flange has a generally rectangular shape as shown while the background bight flange has an extension 322 downwardly from it. The extension has an aperture 323 that receives the latch pin 324. The mutually parallel bight flanges provide a pivotal connection of a cam 313 with its own socket that receives a handle S. As previously shown, the handle allows a worker to set the hook 312b upon the cam 313, rotate the handle downwardly, pull the pipe upwards towards the collar, pull the hook towards the pipe, and set the cam adjacent to the extension thus closing the invention. With the invention closed, the latch pin is inserted through the cam and then the aperture 323, preventing inadvertent rotation of the cam and opening of the invention. The worker then removes the handle. To open the invention, the preceding steps are performed in a reverse sequence.

In the various embodiments described above, each has a horizontal pipe as called a transverse hollow pipe. In the various embodiments with a vertical pipe, it is also called a vertically directed hollow pipe. And the low profile embodiments exclude a vertical pipe and generally merge the transverse hollow pipe directly to the flange. In the various embodiments, the integral tee has a flute, that is a rounded groove, that provides an internal transition in the flow of bulk material through a substantially ninety degree turn. The flute rounds the flow of bulk material where the vertically directed hollow pipe or the flange merges with the transverse hollow pipe.

The split collar with opposite cam bolt and hinge hopper tee and its various components may be manufactured from many materials, including but not limited to, steel, aluminum, polymers, ferrous and non-ferrous metals, their alloys, polymers, high density polyethylene, polypropylene, silicone, nylon, rubber, ceramics, and composites. The various bushings in the embodiments of this invention are generally polymer for inserting pins and for maintaining cleanliness. The horizontal pipe, vertical pipe, flange, cam and related parts may also have a zinc surface treatment that resists road grime, salts, other environmental conditions, heat, and abrasion more than existing tees. The tees also have a heat treated steel alloy that accelerates the unloading process unlike some existing tees where the prior alloy components contribute to slowing the unloading process. The heat treated steel alloy also resists abrasion more than prior art tees. The longer life of the present invention leads to a reduction in repair parts expenses and an increase in the time between replacements of tees due to wear from abrasive bulk materials.

Variations or modifications to the subject matter of this development may occur to those skilled in the art upon review of the invention and its various embodiments as described herein. Such variations, if within the spirit of this development, are intended to be encompassed within the scope of the invention as explained. The description of the preferred embodiment and as shown in the drawings, are set forth for illustrative purposes only to show the principles of this fluted hopper tee and its various embodiments.

I claim:

1. An assembly connecting a valve to a flange of a container, the valve regulating the flow of bulk material from said container located above a horizontal surface or ground, the bulk material having a temperature, into a horizontal unloading system using pressurized air, the horizontal unloading system having an upstream and an opposite downstream flow of bulk material therein, said connecting assembly increasing the rate of unloading the bulk material from the container while operating from one side only of the container, comprising:

a collar, including a first collar and a second collar, said first collar having a generally semi-circular shape and said collar having a generally semi-circular shape wherein said first collar and second collar mutually connect around the flange;

said first collar having two opposite ends and a pair of hinge flanges extending perpendicular to one end of said collar, said hinge flanges having coaxial apertures therein;

said second collar having two opposite ends and a pair of hook flanges extending perpendicular to one end generally opposite said hinge flanges and spaced away from said hinge flanges, said hook flanges being mutually parallel to said hinge flanges;

a hook bolt pivotally connecting to said hook flanges, having a bight generally locating opposite said hook flanges;

a hinge arm pivotally connecting to said hinge flanges;

a flange mutually parallel to and spaced away from said collar and extending beneath said collar when assembled and said hinge arm extending from said flange;

said flange including at least one lug extending away from said flange, said lug adapted to retain the valve placed therein upon said flange, and a pair of bight flanges extending away from said flange generally opposite said at least one lug, said bight flanges being mutually parallel and opposite said hinge arm;

a cam pivotally connecting to said bight flanges, said cam locating generally offset from said hinge arm, and said cam receiving said bight of said hook bolt for attaining a partially closed and a closed position of said assembly from one side of the assembly.

2. The valve to a flange connecting assembly of claim 1 further comprising:

said hinge arm having a length extending outwardly from said flange, said hinge arm narrowing to a wrist outwardly from said flange, said wrist having an integral knuckle; and, said knuckle engaging said hinge flanges.

3. The valve to a flange connecting assembly of claim 2 further comprising:

said knuckle having an adjusting bolt extending there through and said hinge flanges having a pin through said apertures, said pin having a hole there through;

said adjusting bolt passing through said pin wherein changing the position of said adjusting bolt relative to said pin alters the radius of curvature during rotating of said hinge arm.

4. The valve to a flange connecting assembly of claim 1 further comprising:

said flange including a first lug at an angle to the flow of bulk material through said opening, a second lug opposite said first lug generally above said bight flanges and at an angle to the flow of bulk material through said opening, and a third lug upon said hinge arm generally opposite said first lug and said second lug; and, said first lug, said second lug, and said third lug spaced apart and adapted to receive a valve placed therein.

5. The valve to a flange connecting assembly of claim 4 wherein said first lug and said second lug have generally rectangular cross sections and said third lug has a rounded rectangular cross section.

6. The valve to a flange connecting assembly of claim 5 wherein said third lug has a height away from said flange approximately half of the height of said hinge arm and said third lug having the same height as said first lug and said second lug.

7. The valve to a flange connecting assembly of claim 5 wherein said first lug and said second lug have the same height away from said flange and said third lug has a height away from said flange not the same as said first lug and said second lug.

8. The valve to a flange connecting assembly of claim 3 further comprising:

said flange, said bight flanges, and said hinge arm being integral with a horizontal pipe, said flange being tangent to said horizontal pipe and said hinge arm being perpendicular to said horizontal pipe.

9. The valve to a flange connecting assembly of claim 8 further comprising:

said horizontal pipe including fluting in communication with said flange.

10. The valve to a flange connecting assembly of claim 3 further comprising:

said flange, said bight flanges, and said hinge arm being integral with a vertical pipe of a tee, said vertical pipe having an end, said flange being coplanar with the end of said vertical pipe and said hinge arm extending outwardly from said vertical pipe.

11. The valve to a flange connecting assembly of claim 8 wherein said assembly with said horizontal pipe clears at least seven inches above the ground.

12. The valve to a flange connecting assembly of claim 10 wherein said assembly with said horizontal pipe clears at least seven inches above the ground.

13. The valve to a flange connecting assembly of claim 8 wherein said assembly with said horizontal pipe unloads bulk material at approximately 10° F. to approximately 20° F. closer to the temperature of the bulk material.

14. The valve to a flange connecting assembly of claim 3 further comprising:

said knuckle pivoting upon at least one polymer bushing from said hinge flanges and said hook bolt pivoting upon at least one polymer bushing from said hook flanges.

15. The valve to a flange connecting assembly of claim 8 wherein said assembly with said horizontal pipe has a flow capacity of at least approximately 7300 SCFM.

16. An assembly connecting a valve to a flange of a container, the valve regulating the flow of bulk material from said container located above a horizontal surface or ground, the bulk material having a temperature, into a horizontal unloading system using pressurized air, the horizontal unloading system having an upstream and an opposite downstream flow of bulk material therein, said connecting assembly increasing the rate of unloading the bulk material from the container while operating from one side only of the container, comprising:

a first collar and a cooperating second collar, said first collar having a generally semi-circular shape and said collar having a generally semi-circular shape wherein said first collar and second collar mutually adapting to connect around the flange of the flange;

said first collar having two opposite ends and a pair of hinge flanges extending perpendicular to one end of said first collar, said hinge flanges having coaxial apertures therein;

a hinge arm pivotally connecting to said hinge flanges, said hinge arm extending generally below said first collar;

said second collar having two opposite ends and a pair of hook flanges extending perpendicular to one end generally opposite said hinge flanges and spaced away from said hinge flanges, said hook flanges being mutually parallel to said hinge flanges;

a hook bolt pivotally connecting to said hook flanges, having a bight opposite said hook flanges;

a flange mutually parallel to and spaced away from said first collar and said second collar when assembled, said flange extending beneath said first collar and said second collar when assembled, and said hinge arm extending upwardly and outwardly from said flange;

said flange including at least one lug extending away from said flange, said lug adapted to retain the valve placed therein upon said flange, and a pair of bight flanges extending away from said flange generally opposite said at least one lug, said bight flanges being mutually parallel and opposite said hinge arm; and, a cam pivotally connecting to said bight flanges, said cam locating generally offset from said hinge arm, and said cam receiving said bight of said hook bolt for attaining a partially closed and a closed position of said assembly from one side of the assembly.

17. The valve to a flange connecting assembly of claim 16 further comprising:

said hinge arm having a length extending outwardly from said flange, said hinge arm narrowing in cross section to a wrist outwardly from said flange, said wrist having an integral knuckle, said knuckle engaging said hinge flanges; and, said knuckle having an adjusting bolt axially there through and said hinge flanges having a pin through said apertures, said pin having a hole there through admitting said adjusting bolt wherein changing the position of said adjusting bolt relative to said pin alters the radius of curvature of the rotation of said hinge arm to accommodate worn hopper flanges and variations in valves.

18. The valve to a flange connecting assembly of claim 16 further comprising:

said flange, said bight flanges, and said hinge arm being integral with a horizontal pipe, said flange being tangent to said horizontal pipe and said hinge arm being perpendicular to said horizontal pipe.

* * * * *